(12) United States Patent
Rowlands et al.

(10) Patent No.: US 6,948,035 B2
(45) Date of Patent: Sep. 20, 2005

(54) DATA PEND MECHANISM

(75) Inventors: Joseph B. Rowlands, Santa Clara, CA (US); Koray Oner, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 143 days.

(21) Appl. No.: 10/414,363

(22) Filed: Apr. 15, 2003

(65) Prior Publication Data

US 2003/0217238 A1 Nov. 20, 2003

Related U.S. Application Data

(63) Continuation-in-part of application No. 10/270,028, filed on Oct. 11, 2002.
(60) Provisional application No. 60/380,740, filed on May 15, 2002.

(51) Int. Cl.⁷ .......................... G06F 13/00; G06F 12/00
(52) U.S. Cl. .................. 711/141; 711/118; 709/223
(58) Field of Search ................ 709/223, 245, 709/246; 710/306, 308; 711/118, 141, 154, 167, 308

(56) References Cited

U.S. PATENT DOCUMENTS

| | | |
|---|---|---|
| 4,433,378 A | 2/1984 | Leger |
| 4,463,424 A | 7/1984 | Mattson et al. |
| 4,760,571 A | 7/1988 | Schwarz |
| 5,416,907 A * | 5/1995 | Polzin et al. ............... 710/66 |
| 5,640,399 A | 6/1997 | Rostoker et al. |
| 5,668,809 A | 9/1997 | Rostoker et al. |
| 5,778,414 A | 7/1998 | Winter et al. |
| 5,802,287 A | 9/1998 | Rostoker et al. |
| 5,829,025 A | 10/1998 | Mittal |
| 5,887,187 A | 3/1999 | Rostoker et al. |
| 5,893,150 A | 4/1999 | Hagersten et al. |
| 5,908,468 A | 6/1999 | Hartmann |
| 5,914,955 A | 6/1999 | Rostoker et al. |
| 5,974,508 A | 10/1999 | Maheshwari |
| 6,003,106 A * | 12/1999 | Fields et al. ............... 710/308 |
| 6,018,763 A | 1/2000 | Hughes et al. |
| 6,021,451 A | 2/2000 | Bell et al. |

(Continued)

FOREIGN PATENT DOCUMENTS

| | | |
|---|---|---|
| WO | WO 00/30322 | 5/2000 |
| WO | WO 00/52879 | 9/2000 |

OTHER PUBLICATIONS

SiByte; "Target Applications" http://sibyte.com/mercurian.applications.htm; Jan. 15, 2001; 2 pages.

SiByte; "SiByte Technology" http://sibyte.com/mercurian/technology.htm; Jan. 15, 2001; 3 pages.

(Continued)

*Primary Examiner*—Tuan V. Thai
(74) *Attorney, Agent, or Firm*—Garlick Harrison & Markison LLP

(57) ABSTRACT

A node comprises an interconnect, circuitry coupled to the interconnect and configured to initiate a transaction on the interconnect, and a control circuit coupled to provide a response to the transaction on the interconnect. The transaction addresses a block, and the response is indicative of a state of the block in one or more other nodes. The control circuit is configured to cause the transaction to become globally visible to the one or more other nodes dependent on the state in the one or more nodes. Using one or more communication lines separate from lines used to initiate transactions, the control circuit is configured to transmit an indication of the transaction on the interconnect responsive to the transaction becoming globally visible. A transfer of data on the interconnect for the transaction is delayed, responsive to the response from the control circuit, until the indication is transmitted by the control circuit.

19 Claims, 13 Drawing Sheets

U.S. PATENT DOCUMENTS

| | | | |
|---|---|---|---|
| 6,038,644 A | * | 3/2000 | Irie et al. ............... 711/141 |
| 6,092,137 A | | 7/2000 | Huang et al. |
| 6,098,064 A | | 8/2000 | Pirolli et al. |
| 6,111,859 A | | 8/2000 | Godfrey et al. |
| 6,151,662 A | | 11/2000 | Christie et al. |
| 6,157,623 A | | 12/2000 | Kerstein |
| 6,202,125 B1 | | 3/2001 | Patterson et al. |
| 6,202,129 B1 | | 3/2001 | Palanca et al. |
| 6,209,020 B1 | | 3/2001 | Angle et al. |
| 6,215,497 B1 | | 4/2001 | Leung |
| 6,262,594 B1 | | 7/2001 | Cheung et al. |
| 6,266,797 B1 | | 7/2001 | Godfrey et al. |
| 6,269,427 B1 | | 7/2001 | Kuttanna et al. |
| 6,279,087 B1 | | 8/2001 | Melo et al. |
| 6,321,309 B1 | | 11/2001 | Bell et al. |
| 6,332,179 B1 | | 12/2001 | Okpisz et al. |
| 6,349,365 B1 | | 2/2002 | McBride |
| 6,366,583 B2 | | 4/2002 | Rowett et al. |
| 6,373,846 B1 | | 4/2002 | Daniel et al. |
| 6,415,365 B1 | * | 7/2002 | Flynn ................. 711/156 |
| 6,438,651 B1 | | 8/2002 | Slane |
| 6,457,087 B1 | * | 9/2002 | Fu ...................... 710/305 |
| 6,499,080 B1 | * | 12/2002 | Deng ................... 710/305 |
| 6,574,708 B2 | | 6/2003 | Hayter et al. |

OTHER PUBLICATIONS

SiByte; "The Mercurian Processor" http://sibyte.com/mercurian; Jan. 15, 2001; 2 pages.

SiByte; "Fact Sheet, SB–1 CPU" Oct. 2000; 1 page.

SiByte; "Fact Sheet, SB–1250" Oct. 2000; 10 pages.

Stepanian; "SiByte SB–1 MIPS64 CPU Core" Embedded Processo Forum 2000; Jun. 13, 2000, 15 pages.

Keller; "The Mercurian Processor: A High Performance, Power–efficient CMP for Networking" Oct. 10, 2000; 22 pages.

Saulsbury et al.; "An Argument for Simple COMA" SICS Research Report No.: R94:15; Aug. 1, 1994; 20 pages.

Lenoski; "The Design And Analysis Of Dash: A Scalable Directory–Based Multiprocessor" Dissertation–Stanford University; Dec. 1991; 176 pages.

"21143 PCI/Card Bus 10/100Mb/s Ethernet LAN Controller" Hardware Reference Manual; Intel Corp.; Oct. 1998.

"Pentium Pro Family Developer's Manual, vol. 1: Specifications" Intel Corporation; 1996; pp 4–1 to 4–18.

"PowerPC 601, RISC Microprocessor User's Manual" MPC601UM/AD; 1993; 1 page.

"Pentium Processor Family User's Manual, vol. 1: Pentium Processor Family Data Book"; Intel Corp.; 1994; 2 pages.

Katevenis et al.; "ATLAS I: a single–chip, gigabit ATM switch with HIC/HS links and multi–lane back–pressure" Microprocessors and Microsystems; 1998; pp 481–490.

Halfhill; "SiByte Reveals 64–Bit Core For NPUs, Independent MIPS64 Design Combines Low Power, High Performance" Microdesign Resources; Jun. 2000, 4 pages.

U.S. Appl. No. 09/680,524, filed Oct. 6, 2000, Rowlands et al.; "Source Triggered Transaction Blocking".

U.S. Appl. No. 09/829,514, filed Apr. 9, 2001, Kruckemyer et al.; "Cache Coherent Protocol In Which Exclusive . . . ".

U.S. Appl. No. 10/413,917, filed Apr. 15, 2003, Rowlands et al.; "Cache Programmable To Partition Ways To Agents . . . ".

U.S. Appl. No. 10/269,922, filed Oct. 11, 2002, Sano et al.; "Systems Using Mix of Packet, Coherent,and Noncoherent . . . ".

U.S. Appl. No. 10/270,028, filed Oct. 11, 2002, Rowlands; "System Having Interfaces, Switch, And Memory Bridge . . . ".

U.S. Appl. No. 10/269,827, filed Oct. 11, 2002, Rowlands et al.; "Remote Line Directory Which Covers Subset of . . . ".

U.S. Appl. No. 10/269,828, filed Oct. 11, 2002, Rowlands; "L2 Cache Maintaining Local Ownership Of . . . ".

U.S. Appl. No. 10/270,480, filed Oct. 11, 2002, Rowlands; "System Having Address–Based Intranode Coherency and . . . ".

* cited by examiner

Interconnect Transactions

| Transaction |
|---|
| RdShd |
| RdExc |
| Wr |
| WrInv |
| RdKill |
| RdInv |
| WrFlush |
| Nop |

— 142

HTcc Commands

| Command | Virtual Channel |
|---|---|
| cRdShd | CRd |
| cRdExc | CRd |
| Flush | Probe |
| Kill | Probe |
| Kill_Ack | Ack |
| WB | Ack |
| Fill | CFill |

DATA PEND MECHANISM

This application claims benefit of priority to U.S. Provisional Patent Application Ser. No. 60/380,740, filed May 15, 2002. This application is a continuation in part of U.S. patent application Ser. No. 10/270,028, filed on Oct. 11, 2002.

BACKGROUND OF THE INVENTION

1. Field of the Invention

This invention is related to the field of coherent memory systems and, more particularly, to ensuring global visibility of operations in a coherent memory system.

2. Description of the Related Art

Memory systems (including main memory and any caches in the system) are often designed to be coherent. That is, even though multiple copies of data from a given memory location may exist in the memory system, a read of that memory location returns the most recent data written to that memory location. The most recent data written to that memory location may be determined via an order of accesses to the memory location established according to the coherency mechanism. Typically, a coherent system may include one or more coherent agents and a memory controller coupled via an interconnect of some kind.

One mechanism for scaling coherent systems to larger numbers of coherent agents is a distributed memory system. In such a system, memory is distributed among various nodes (which may also include coherent agents), and the nodes are interconnected. A coherent agent in one node may access memory in another node. One class of techniques for maintaining coherency in a distributed memory system is referred to as cache-coherent, nonuniform memory access (CC-NUMA). In a CC-NUMA system, access to memory may have a varying latency (e.g. memory in the same node as an agent may be accessed more rapidly than memory in another node, and accesses to different nodes may have varying latencies as well), but coherency is maintained. Data from another node may be cached in a given node.

When an agent in a node accesses memory in that node, that node may need to communicate with other nodes to maintain coherency. For example, if the agent attempts to gain exclusive access to a block of memory, and other nodes have shared copies of the block, the other nodes may need to invalidate the block. If the agent is gaining exclusive access to update the block, the updates should not occur until the access is globally visible to the other nodes (so that the other nodes do not permit access to the shared copies that are not up to date with the updates made by the agent). A mechanism for ensuring global visibility is thus needed.

SUMMARY OF THE INVENTION

In one embodiment, a node comprises an interconnect, circuitry coupled to the interconnect and configured to initiate a transaction on the interconnect, and a control circuit coupled to provide a response to the transaction on the interconnect. The transaction addresses a block, and the response is indicative of a state of the block in one or more other nodes. The control circuit is configured to cause the transaction to become globally visible to the one or more other nodes dependent on the state in the one or more nodes. Using one or more communication lines separate from lines used to initiate transactions, the control circuit is configured to transmit an indication of the transaction on the interconnect responsive to the transaction becoming globally visible. A transfer of data on the interconnect for the transaction is delayed, responsive to the response from the control circuit, until the indication is transmitted by the control circuit.

In another embodiment, a node comprises an interconnect, an agent coupled to the interconnect and configured to initiate a transaction on the interconnect, and a memory bridge coupled to the interconnect. The memory bridge is responsible for internode coherency within the node, and is configured to transmit a response to the transaction on the interconnect indicative of the state of a block addressed by the transaction in one or more other nodes. Using one or more communication lines of the interconnect separate from lines used to initiate transactions, the memory bridge is configured to transmit an indication of the transaction responsive to ensuring that the transaction is globally visible to the one or more other nodes. A transfer of data for the transaction is delayed until the memory bridge transmits the indication.

A method is contemplated in some embodiments. A response to a transaction initiated on an interconnect in a node is transmitted, wherein the response is indicative of a state of a block addressed by the transaction in one or more other nodes. An indication of the transaction is transmitted on one or more communication lines of the interconnect responsive to the transaction becoming globally visible to the one or more other nodes, wherein the one or more communication lines are separate from lines used for initiating transactions on the interconnect. A transfer of data for the transaction is delayed until the transmitting of the indication dependent on the response to the transaction.

BRIEF DESCRIPTION OF THE DRAWINGS

The following detailed description makes reference to the accompanying drawings, which are now briefly described.

FIG. 8 is a table illustrating an exemplary set of coherency commands and a table illustrating an exemplary set of transactions according to one embodiment of the node shown in FIG. 1.

Figure 1:
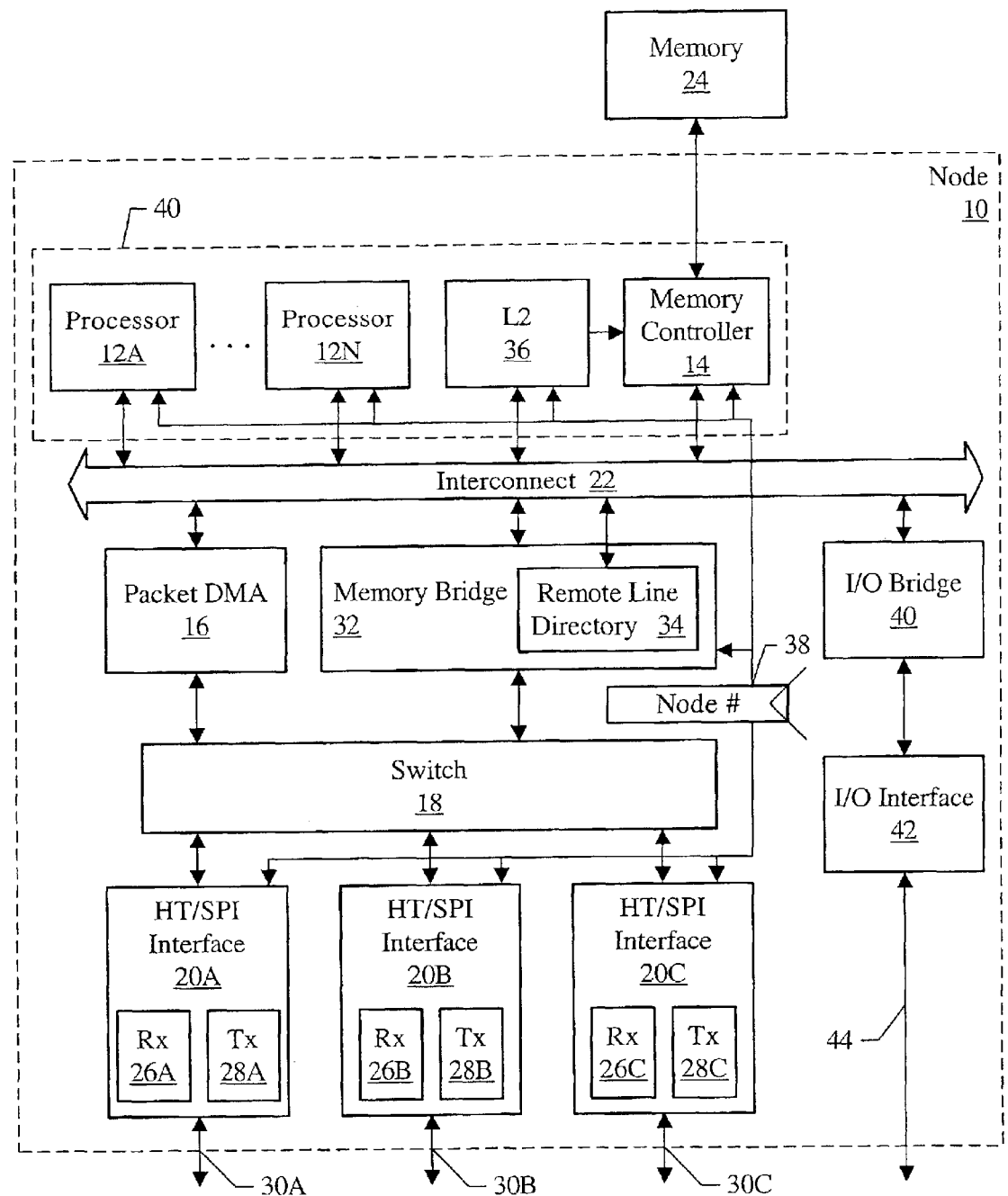
FIG. 1 is a block diagram of one embodiment of a node that may be used in a multinode coherent system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview

Turning now to FIG. 1, a block diagram of one embodiment of a node 10 is shown. In the embodiment of FIG. 1, the node 10 includes one or more processors 12A–12N, a memory controller 14, a switch 18, a set of interface circuits 20A–20C, a memory bridge 32, a packet DMA circuit 16, an L2 cache 36, an input/output (I/O) bridge 40, and an I/O interface 42. The memory bridge 32 includes a remote line directory 34. The node 10 includes an interconnect 22 to which the processors 12A–12N, the memory controller 14, the L2 cache 36, the memory bridge 32, the packet DMA circuit 16, the remote line directory 34, and the I/O bridge 40 are coupled. The node 10 is coupled, through the memory controller 14, to a memory 24. The interface circuits 20A–20C each include a receive (Rx) circuit 26A–26C and a transmit (Tx) circuit 28A–28C. The node 10 is coupled to a set of interfaces 30A–30C through respective interface circuits 20A–20C. The interface circuits 20A–20C are coupled to the switch 18, which is further coupled to the memory bridge 32 and the packet DMA circuit 16. A configuration register 38 is also illustrated in FIG. 1, which stores a node number (Node #) for the node 10. The configuration register 38 is coupled to the L2 cache 36, the memory controller 14, the memory bridge 32, and the interface circuits 20A–20C in the embodiment of FIG. 1. The processors 12A–12N may also be coupled to receive the node number from the configuration register 38. The I/O bridge 40 is coupled to an I/O interface circuit 42, which is coupled to an I/O interface 44.

The node 10 may be used as a node in a multinode coherent system. In such a coherent system, internode coherency may be maintained via coherency commands transmitted to the node 10 and by the node 10 on one or more of the interfaces 30A–30C (via the interface circuits 20A–20C, respectively). Additionally, packets may be transmitted/received on one or more interfaces 30A–30C (via the interface circuits 20A–20C). Thus, a mix of packet and coherent traffic may be received on the interfaces 30A–30C. As used herein, a memory bridge includes circuitry designed to handle internode coherency functions within a node. Thus, the memory bridge 32 may be a source/destination of the coherency commands. In response to at least some received coherency commands, the memory bridge 32 may generate corresponding transactions on the interconnect 22. In response to at least some transactions on the interconnect 22 generated by other agents, the memory bridge 32 may generate coherency commands. As used herein, a packet DMA circuit comprises circuitry to communicate packets to and from a memory. The packet DMA circuit 16 may generate write transactions on the interconnect 22 to the memory controller 14 to write received packets to the memory 24, and may generate read transactions on the interconnect 22 to read packets from the memory 24 for transmission by one of the interface circuits 20A–20C.

The switch 18 may transfer coherent traffic and packet traffic from the interface circuits 20A–20C, routing the coherent traffic to the memory bridge 32 and routing the packet traffic to the packet DMA circuit 16. In one embodiment, the switch 18 may generally select sources and destinations to be coupled for communication based on requests from the sources to transmit data and requests from the destinations for data. For example, the interface circuits 20A–20C (particularly the Rx circuits 26A–26C) may identify coherency commands and packets received on the interfaces 30A–30C, and may request transfer to the packet DMA circuit 16 (for packets) and the memory bridge 32 (for coherency commands). If the packet DMA circuit 16 or memory bridge 32 has indicated the ability to receive data of the corresponding type, the switch 18 may grant a transfer between a requesting Rx circuit 26A–26C and the packet DMA circuit 16 or the memory bridge 32. Similarly, the packet manger 16 or memory bridge 32 may request a transfer to an interface circuit 20A–20C (particularly, to a Tx circuit 28A–28C). If the Tx circuit 28A–28C has indicated the ability to receive data of the corresponding type, the switch 18 may grant a transfer between the requesting packet DMA circuit 16/memory bridge 32 and the Tx circuit 28A–28C.

In one embodiment, the interfaces 30A–30C may support a set of virtual channels in which coherency commands, noncoherent commands, and packets are transmitted. Each virtual channel is defined to flow independent of the other virtual channels, even though the virtual channels may share certain physical resources (e.g. the interface 30A–30C on which the commands are flowing). These virtual channels may be mapped to internal virtual channels (referred to as switch virtual channels herein). The switch 18 may be virtual-channel aware. That is, the switch 18 may grant a coupling between a source and a destination based not only on the ability of the source to transfer data and the destination to receive data, but also on the ability of the source to transfer data in a particular switch virtual channel and the destination to receive data on that switch virtual channel. Thus, requests from sources may indicate the destination and the virtual channel on which data is to be transferred, and requests from destinations may indicate the virtual channel on which data may be received. The switch virtual channels may identify a destination and a virtual channel at that destination, and they may be referred to as the destination and virtual channel, or collectively as the switch virtual channel, herein.

Additionally, in some embodiments, the switch 18 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary. A similar boundary condition may be used for coherency commands, if more than one transfer through the switch 18 is used to transfer coherency commands.

Each of the interfaces 30A–30C used for coherent communications are defined to be capable of transmitting and receiving coherency commands. Particularly, in the embodiment of FIG. 1, those interfaces 30A–30C may be defined to receive/transmit coherency commands to and from the node 10 from other nodes. Additionally, other types of commands may be carried. In one embodiment, each interface 30A–30C that is used to carry coherency commands may be a HyperTransport™ (HT) interface, including an extension to the HT interface to include coherency commands (HTcc). Additionally, in some embodiments, an extension to the HyperTransport interface to carry packet data (Packet over HyperTransport, or PoHT) may be supported. As used herein, coherency commands include any communications between nodes that are used to maintain coherency between nodes. The commands may include read or write requests initiated by a node to fetch or update a cache block belonging to another node, probes to invalidate cached copies of cache blocks in remote nodes (and possibly to return a modified copy of the cache block to the home node), responses to probe commands, fills which transfer data, etc.

In some embodiments, one or more of the interface circuits 20A–20C may not be used for coherency management and may be defined as packet interfaces. The corresponding interfaces 30A–30C may be HT interfaces using the PoHT extension. Alternative, such interfaces 30A–30C may be system packet interfaces (SPI) according to any level of the SPI specification set forth by the Optical Internetworking Forum (e.g. level 3, level 4, or level 5). In one particular embodiment, the interfaces may be SPI-4 phase 2 interfaces. In the illustrated embodiment, each interface circuit 20A–20C may be configurable to communicate on either the SPI-4 interface or the HT interface. Each interface circuit 20A–20C may be individually programmable, permitting various combinations of the HT and SPI-4 interfaces as interfaces 30A–30C. The programming may be performed in any fashion (e.g. sampling certain signals during reset, shifting values into configuration registers (not shown) during reset, programming the interfaces with configuration space commands after reset, pins that are tied up or down externally to indicate the desired programming, etc.). Other embodiments may employ any interface capable of carrying packet data (e.g. the Media Independent Interface (MII) or the Gigabit MII (GMII) interfaces, X.25, Frame Relay, Asynchronous Transfer Mode (ATM), etc.). The packet interfaces may carry packet data directly (e.g. transmitting the packet data with various control information indicating the start of packet, end of packet, etc.) or indirectly (e.g. transmitting the packet data as a payload of a command, such as PoHT). The SPI-4 interface may define 16 hardware virtual channels, extendable to 256 virtual channels in software.

The node 10 may support intranode coherency for transactions on the interconnect 22. Additionally, the node 10 may support internode coherency with other nodes (e.g. a CC-NUMA coherency, in one embodiment). For example, in one embodiment, if a transaction on the interconnect 22 (e.g. a transaction issued by the processors 12A–12N) accesses a cache block that is remote to the node 10 (i.e. the cache block is part of the memory coupled to a different node) and the node 10 does not have sufficient ownership to perform the transaction, the memory bridge 32 may issue one or more coherency commands to the other nodes to obtain the ownership (and a copy of the cache block, in some cases). Similarly, if the transaction accesses a local cache block but one or more other nodes have a copy of the cache block, the memory bridge 32 may issue coherency commands to the other nodes. Still further, the memory bridge 32 may receive coherency commands from other nodes, and may perform transactions on the interconnect 22 to effect the coherency commands.

In one embodiment, a node such as node 10 may have memory coupled thereto (e.g. memory 24). The node may be responsible for tracking the state, in other nodes, of each cache block from the memory in that node. A node is referred to as the "home node" for cache blocks from the memory assigned to that node. A node is referred to as a "remote node" for a cache block if the node is not the home node for that cache block. Similarly, a cache block is referred to as a local cache block in the home node for that cache block and as a remote cache block in other nodes.

Generally, a remote node may begin the coherency process by requesting a copy of a cache block from the home node of that cache block using a coherency command. The memory bridge 32 in the remote node, for example, may detect a transaction on the interconnect 22 that accesses the cache block and may detect that the remote node does not have sufficient ownership of the cache block to complete the transaction (e.g. it may not have a copy of the cache block at all, or may have a shared copy and may require exclusive ownership to complete the transaction). The memory bridge 32 in the remote node may generate and transmit the coherency command to the home node to obtain the copy or to obtain sufficient ownership. The memory bridge 32 in the home node may determine if any state changes in other nodes are to be performed to grant the requested ownership to the remote node, and may transmit coherency commands (e.g. probe commands) to effect the state changes. The memory bridge 32 in each node receiving the probe commands may effect the state changes and respond to the probe commands. Once the responses have been received, the memory bridge 32 in the home node may respond to the remote node (e.g. with a fill command including the cache block).

The remote line directory 34 may be used in the home node to track the state of the local cache blocks in the remote nodes. The remote line directory 34 is updated each time a cache block is transmitted to a remote node, the remote node returns the cache block to the home node, or the cache block is invalidated via probes. As used herein, the "state" of a cache block in a given node refers to an indication of the ownership that the given node has for the cache block according to the coherency protocol implemented by the nodes. Certain levels of ownership may permit no access, read-only access, or read-write access to the cache block. For example, in one embodiment, the modified, shared, and invalid states are supported in the internode coherency protocol. In the modified state, the node may read and write the cache block and the node is responsible for returning the block to the home node if evicted from the node. In the shared state, the node may read the cache block but not write the cache block without transmitting a coherency command to the home node to obtain modified state for the cache block. In the invalid state, the node may not read or write the cache block (i.e. the node does not have a valid copy of the cache block). Other embodiments may use other coherency protocols (e.g. the MESI protocol, which includes the modified, shared, and invalid states and an exclusive state in which the cache block has not yet been updated but the node is permitted to read and write the cache block, or the MOESI protocol which includes the modified, exclusive, shared, and invalid states and an owned state which indicates that there may be shared copies of the block but the copy in main memory is stale). In one embodiment, agents within the node may implement the MESI protocol for intranode coherency. Thus, the node may be viewed as having a state in the internode coherency and individual agents may have a state in the intranode coherency (consistent with the internode coherency state for the node containing the agent).

Generally speaking, a node may include one or more coherent agents (dotted enclosure 40 in FIG. 1). In the embodiment of FIG. 1, the processors 12A–12N, the L2 cache 36, and the memory controller 14 may be examples of coherent agents 40. The I/O bridge 40 may also be a coherent agent. The memory bridge 32 may be a coherent agent (on behalf of other nodes). Generally, an agent includes any circuit which participates in transactions on an interconnect. A coherent agent is an agent that is capable of performing coherent transactions and/or operating in a coherent fashion with regard to transactions. A transaction is a communication on an interconnect. The transaction is sourced by one agent on the interconnect, and may have one or more agents as a target of the transaction. Read transactions specify a transfer of data from a target to the source, while write transactions specify a transfer of data from the source to the target. Other transactions may be used to communicate between agents without transfer of data, in some embodiments.

In one embodiment, the remote line directory 34 may be configured to track a subset of the local memory space that may be coherently shared with other nodes. That is, the remote line directory 34 may be configured to track up to a maximum number of cache blocks, where the maximum number is less than the total number of cache blocks that may be coherently shared. In another embodiment, the maximum number may be less that the total number of remote cache entries. The remote line directory may have any structure (e.g. cache-like structures such as direct-mapped, fully associative, set associative, etc.). In one embodiment, the remote line directory 34 may be 16 k entries arranged in an 8 way set associative structure. If a cache block is being accessed by a remote node, and the remote line directory 34 in the home node detects a miss for the cache block, an entry is allocated to track the cache block. If the allocated entry is currently allocated to track a second cache block, the memory bridge 32 in the home node may generate probes to evict the second cache block from the other nodes (and possibly write back modified data to the home node, if applicable).

In one implementation, the L2 cache 36 in a remote node is designated to retain the node state for modified remote cache blocks. If the L2 cache 36 evicts a modified remote cache block, the L2 cache 36 may cause the remote block to be evicted from the node as a whole (e.g. using a WrFlush command described below).

It is noted that, in some embodiments, a coherency command may be received by an interface circuit 20A–20C that is passing through the node 10 to another node, and does not require processing in the node 10. The interface circuits 20A–20C may be configured to detect such commands and retransmit them (through another interface circuit 20A–20C via the switch 18) without involving the memory bridge 32.

If the Rx circuit 26A–26C receives a packet and determines that the destination for the packet is a Tx circuit 28A–28C (to be transmitted to another node 10 or elsewhere), the Rx circuit 26A–26C may transmit the packet through the switch 18 to the Tx circuit 28A–28C. The packet may not be transmitted to memory, nor acted upon by the processors 12A–12N. The Rx circuits 26A–26C may determine that received packets are to be stored to the memory 24 (by the packet DMA circuit 16) for processing within the node 10. In one embodiment, the packet DMA circuit 16 may comprise a set of input queues (the virtual channels in the packet DMA circuit 16) to which a packet may be mapped by the Rx circuits 26A–26C. The switch 18 may route the packets to the packet DMA circuit 16 for storage in the identified input queue. Similarly, software may generate packets and store them in packet DMA circuit output queues. The output queues may be mapped to a Tx circuit 28A–28C (and an output virtual channel in the Tx circuit 28A–28C), and the switch 18 may route packets from the packet DMA circuit 16 to the Tx circuit 28A–28C.

As used herein, a "packet" may include any communication between a source and a destination which includes one or more headers defining the source and destination of the packet at various levels within the source and destination and which may include a data payload. "Packet data" may include any data that is part of a packet, or may refer to multiple packets. In some embodiments, the packet DMA circuit 16 may be programmable to target packet data into the L2 cache 36 (that is, to store a portion of a packet or all of the packet in the L2 cache 36) in addition to storing packet data to memory 24.

The processors 12A–12N may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The node 10 may include any number of processors (e.g. as few as one processor, two processors, four processors, etc.).

The L2 cache 36 may be any type and capacity of cache memory, employing any organization (e.g. set associative, direct mapped, fully associative, etc.). In one embodiment, the L2 cache 36 may be an 8 way, set associative, 1 MB cache. The L2 cache 36 is referred to as L2 herein because the processors 12A–12N may include internal (L1) caches. In other embodiments the L2 cache 36 may be an L1 cache, an L3 cache, or any other level as desired.

The memory controller 14 is configured to access the memory 24 in response to read and write transactions received on the interconnect 22. The memory controller 14 may receive a hit signal from the L2 cache, and if a hit is detected in the L2 cache for a given read/write transaction, the memory controller 14 may not respond to that transaction. The memory controller 14 may be designed to access any of a variety of types of memory. For example, the memory controller 14 may be designed for synchronous dynamic random access memory (SDRAM), and more particularly double data rate (DDR) SDRAM. Alternatively, the memory controller 16 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The I/O bridge 40 may bridge communications from one or more I/O interfaces to the interconnect 22. The I/O bridge 40 may initiate transactions on the interconnect 22 in response to communications from the I/O interface circuit 42 (in response to communications on the I/O interface 44), and may receive transactions from the interconnect 22 on behalf of the I/O interface circuit 42. One or more I/O interface circuits 42 may be coupled to an I/O bridge 40, and one or more I/O bridges 40 may be included. Any I/O interface 44 may be bridged in this manner (e.g. Peripheral Component Interconnect (PCI), serial interfaces, PCMCIA interfaces, etc.). In one particular embodiment, the I/O interface circuit 42 may be an Ethernet Media Access Controller (MAC) interface and the I/O interface 44 may be an MII or GMII interface.

The interconnect 22 may be any form of communication medium between the devices coupled to the interconnect. For example, in various embodiments, the interconnect 22 may include shared buses, crossbar connections, point-to-point connections in a ring, star, or any other topology, meshes, cubes, etc. The interconnect 22 may also include storage, in some embodiments. In one particular embodiment, the interconnect 22 may comprise a bus. The bus may be a split transaction bus, in one embodiment (i.e. having separate address and data phases). The data phases of various transactions on the bus may proceed out of order with the address phases. The bus may also support coherency and thus may include a response phase to transmit coherency response information. The bus may employ a distributed arbitration scheme, in one embodiment. In one embodiment, the bus may be pipelined. The bus may employ any suitable signaling technique. For example, in one embodiment, differential signaling may be used for high speed signal transmission. Other embodiments may employ any other signaling technique (e.g. TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired.

Various embodiments of the node 10 may include additional circuitry, not shown in FIG. 1. For example, the node 10 may include various I/O devices and/or interfaces. Exemplary I/O may include one or more PCI interfaces, one or more serial interfaces, Personal Computer Memory Card International Association (PCMCIA) interfaces, etc. Such interfaces may be directly coupled to the interconnect 22 or may be coupled through one or more I/O bridge circuits.

In one embodiment, the node 10 (and more particularly the processors 12A–12N, the memory controller 14, the L2 cache 36, the interface circuits 20A–20C, the memory bridge 32 including the remote line directory 34, the packet DMA circuit 16, the switch 18, the configuration register 38, and the interconnect 22) may be integrated onto a single integrated circuit as a system on a chip configuration. The additional circuitry mentioned above may also be integrated. Alternatively, other embodiments may implement one or more of the devices as separate integrated circuits. In another configuration, the memory 24 may be integrated as well. Alternatively, one or more of the components may be implemented as separate integrated circuits, or all components may be separate integrated circuits, as desired. Any level of integration may be used.

It is noted that, while three interface circuits 20A–20C are illustrated in FIG. 1, one or more interface circuits may be implemented in various embodiments. As used herein, an interface circuit includes any circuitry configured to communicate on an interface according to the protocol defined for the interface. The interface circuit may include receive circuitry configured to receive communications on the interface and transmit the received communications to other circuitry internal to the system that includes the interface circuit. The interface circuit may also include transmit circuitry configured to receive communications from the other circuitry internal to the system and configured to transmit the communications on the interface.

It is further noted that, while the cache block may be referred to as the granularity on which coherency is maintained, other embodiments may use different granularities greater than or less than a cache block in size. In such embodiments, a "coherency block" may be treated in the same fashion as a "cache block" or "block" when discussing coherency. Generally, a "coherency block" may include a set of contiguous (in memory) bytes which are treated as a unit for coherency purposes. In various embodiments, a coherency block may comprise a portion of a cache block, a single cache block, or multiple cache blocks, as desired.

Data Pend Mechanism

Generally, as part of granting ownership of a block to an agent in response to a transaction, the transaction is made "globally visible". In a coherent system comprising multiple nodes, a transaction may be "globally visible" if the effect that the transaction has on the ownership of the block by other nodes in the system has been committed by those nodes. For example, in one embodiment of the node 10, the memory bridge in the home node of the block may: (i) transmit probe coherency commands (or more succinctly, "probe commands" or "probes") to the nodes whose ownership is to be changed in order to grant ownership to the initiator of the transaction; and (ii) collect the probe acknowledgements from each node. The probe acknowledgement from a node indicates that the receiving node has committed the ownership change indicated by the corresponding probe. As described above with regard to FIG. 1, the ownership may be represented by the state of the block in the node, and thus ownership changes may be performed by updating the state of the block to represent the requested ownership. As used herein, a "probe" or "probe command" refers to any operation initiated to cause a coherent device that receives the probe to change its coherency state (its ownership) for a block and to possibly transmit the block back to the initiator of the probe. For example, the Kill and Flush coherency commands may be probes in the embodiment illustrated via FIGS. 8–12. A "probe acknowledgement" may be an operation transmitted by the receiver of a probe to acknowledge that the requested ownership change has been made. For example, the Kill_Ack and WB coherency commands may be probe acknowledgements in the embodiment of FIGS. 8–12.

Figure 2:
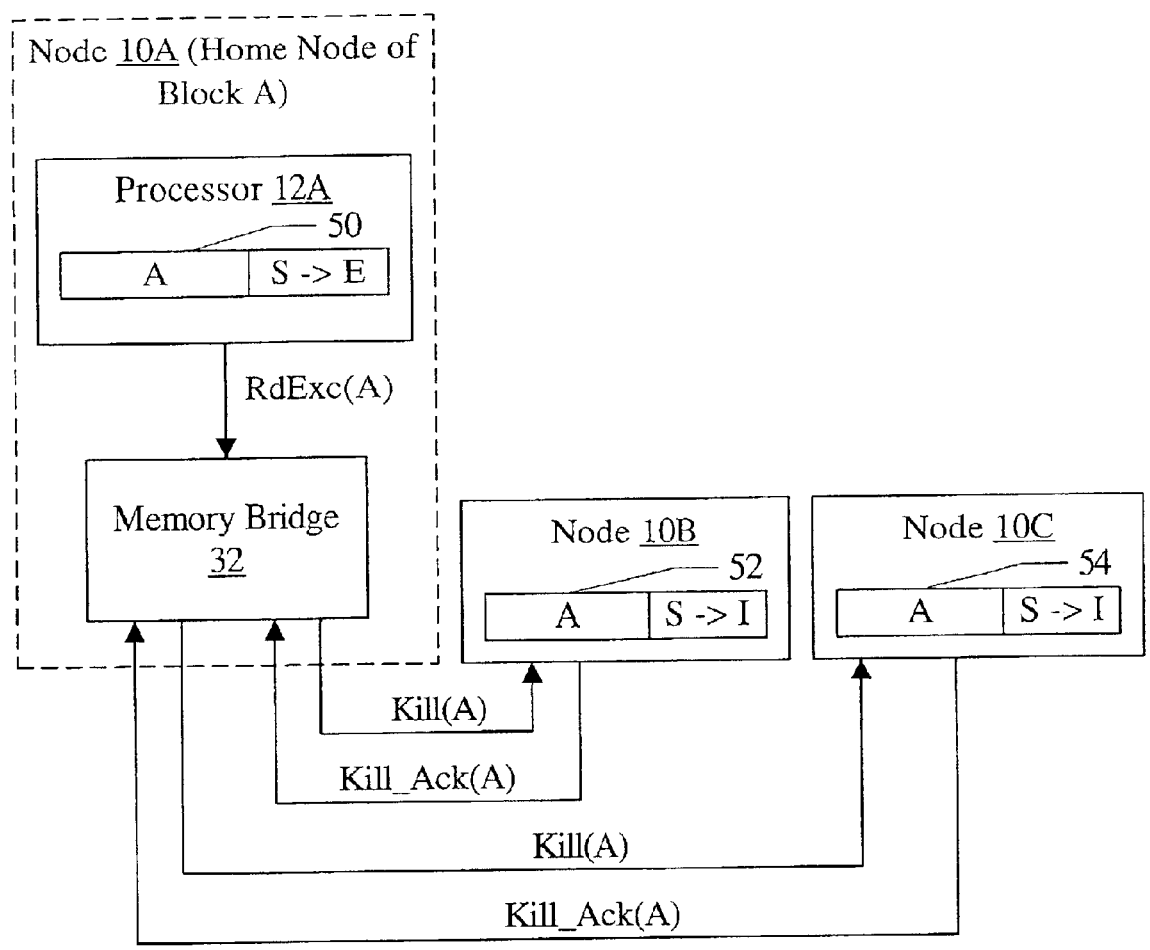
FIG. 2 is a block diagram of several nodes in an exemplary multinode system.

In many cases, the state changes required to make a transaction globally visible occur prior to the agent being provided data for the transaction, and thus before the agent may use the data. However, in some cases, it might otherwise be possible for the agent to receive data prior to the transaction becoming globally visible. If such a transaction provides the agent with exclusive ownership (permitting update of the block), then the agent may modify the block. If the transaction is not yet globally visible when the modifications are made, other nodes may access a stale (out of date) copy of the block and thus coherency will be violated. FIG. 2 is a block diagram illustrating an example of a transaction which could receive data prior to the transaction becoming globally visible. Similarly, if a transaction may occur that causes an update of the block before becoming globally visible, other nodes may access a stale copy and thus violate coherency.

In FIG. 2, three nodes 10A, 10B, and 10C are illustrated. Each node 10A–10C may be an instantiation of the node 10 shown in FIG. 1. The node 10A is a home node of a block A. Illustrated within the node 10A are the processor 12A and the memory bridge 32. The processor 12A is caching the block A in the shared state and desires to have the block A in the exclusive state (as illustrated at reference numeral 50). The nodes 10B and 10C are caching the block A in the shared state (illustrated at reference numerals 52 and 54). For the processor 12A to transition to the exclusive state (S->E in FIG. 2 at reference numeral 50), the nodes 10B–10C are required to transition to the invalid state (S->I reference numerals 52 and 54, respectively, in FIG. 2).

The processor 12A initiates a RdExc transaction addressing the block A (illustrated as RdExc(A) in the node 10A in FIG. 2) to request exclusive access to the block A. The memory bridge 32, based on the contents of the remote line directory 34, determines that the nodes 10B and 10C have the block A in the shared state. The memory bridge 32 may transmit Kill probes to request invalidation of the shared copies in the nodes 10B and 10C, and the nodes 10B and 10C may acknowledge the Kill probes (with Kill_Ack commands) to indicate that the shared copies have been invalidated.

Since only shared copies exist in the system, the memory controller 14 in the node 10A may supply the data for the RdExc transaction. The memory controller 14 might supply the data prior to the nodes 10B and 10C having invalidated their copies. If the processor 12A modifies the exclusive copy of the data supplied to it by the memory controller 14, the nodes 10B and 10C may access stale copies of the data.

In some embodiments, either the memory controller 14 or the L2 cache 36 may supply the data if only shared copies exist. In the present embodiment, the L2 cache 36 may detect cases in which a block is being shared remotely and is stored in the modified state in the L2 cache 36. The L2 cache 36 may clean its copy of the block in this case (and the memory controller 14 is updated with the modified copy from the L2 cache 36) and may indicate a cache miss for data pended transactions. Thus, in the above situation, the memory controller 14 may be the supplier of data for the present embodiment.

While the example of FIG. 2 occurs to transition from the shared to the exclusive state, a similar circumstance exists if the processor 12A does not have a copy of the block A (i.e. the block A is effectively in the invalid state in the processor 12A when the processor 12A performs the RdExc(A) transaction). Additionally, any agent in the node 10A may initiate the RdExc(A) transaction, including the memory bridge 32 (on behalf of an agent in another node). The WrInv transaction, described in more detail below, which permits the initiating agent to overwrite the block in memory even if the initiating agent does not have exclusive ownership of the block, could perform a data transfer prior to the WrInv transaction becoming globally visible and thus also may permit a remote node to access a stale copy of a block that has been modified.

In order to prevent the transfer of data in such cases, the node 10 may implement a flow control mechanism. The data source of a transaction (e.g. the memory controller 14 for read transactions, or the initiating agent for write transactions), in situations in which a data transfer may otherwise occur prior to the transaction being globally visible, may delay transfer of the data for the transaction until the memory bridge 32 transmits an indication of the transaction to the data source. The preceding activity may be referred to as the data source "pending the data", and the transaction may be referred to as "pended" or "data pended". The memory bridge 32 may cause the transaction to become globally visible, then transmit the indication to the data source. Subsequently, the data source may transfer the data. For example, in the embodiment of FIG. 1 and FIGS. 8–12, the memory bridge 32 may determine that the transaction is globally visible by transmitting probes to any nodes which may require a state change and by collecting the probe acknowledgements from those nodes.

The interconnect 22 may include various communication lines used to initiate transactions (e.g. an address bus, in a split transaction bus embodiment), and the memory bridge 32 may use one or more communication lines separate from the lines used to initiate transactions to transmit the indication of the transaction to the data source. For example, in one embodiment, the initiating agent may assign a transaction identifier (TID) to each transaction. The TID of the transaction may be the indication used by the memory bridge 32 to identify the transaction to the data source. Generally, the transaction is initiated by the initiating agent and remains outstanding on the interconnect 22 until the memory bridge 32 transmits the TID to the data source and the data source supplies the data for the transaction. As used herein, a transaction identifier may include any value which uniquely identifies a transaction on the interconnect 22 while the transaction is outstanding.

It is noted that, while a transaction identifier is used by the memory bridge 32 to signal the data source that data may be transferred for a pended transaction, other embodiments may use any other indication. For example, an embodiment which permits only one outstanding pended transaction may use a signal that may be asserted when the data may be transmitted.

Figure 3:
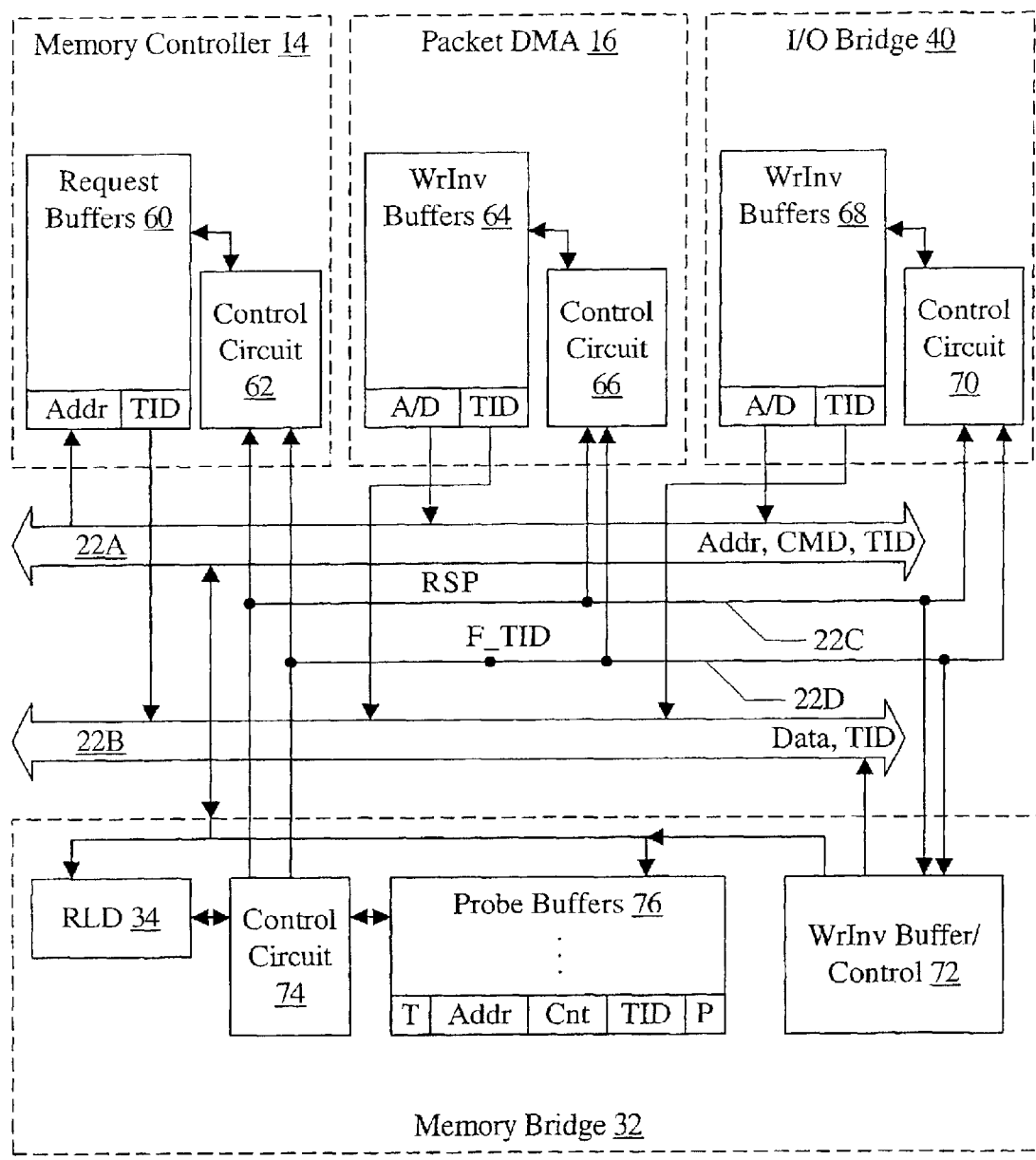
FIG. 3 is a block diagram of a portion of the node shown in FIG. 1 in more detail.

Turning now to FIG. 3, a block diagram of one embodiment of a portion of the node 10 is shown in greater detail. In the embodiment of FIG. 3, the interconnect 22 may include a split transaction bus comprising an address bus 22A and a data bus 22B. Transactions may include an address phase transmitted on the address bus 22A and a data phase transmitted on the data bus 22B. The address bus 22A may include the address of the block addressed by the transaction, a TID, and a command (CMD) indicating the transaction (e.g. one of the transactions shown in FIG. 8, for one embodiment). Additional address bus signals may be included as desired to indicate other attributes of the transaction. The data bus 22B may include the data for the transaction and the TID (used to match the data phase to the corresponding address phase). Additional data bus signals may be included as desired (e.g. error signals, etc.). The interconnect 22 may include response (RSP) lines 22C on which the memory bridge 32 is configured to provide a response (and response lines on which other coherent agents are configured to provide a response, not shown in FIG. 3) during the response phase of the transaction. The interconnect 22 may further include an F_TID bus 22D on which the memory bridge 32 may transmit the TID of a pended transaction to the data source of the transaction, to indicate that the data may be transferred.

The memory controller 14 is illustrated in FIG. 3, and may include a set of request buffers 60 and a control circuit 62 coupled to the request buffers 60. The request buffers 60 may be coupled to receive transactions from the interconnect 22 (specifically, from the address bus 22A in the illustrated embodiment). Generally, the request buffers 60 may store memory requests (reads or writes) for which the memory controller 14 is to provide data or for which the memory controller 14 is to update memory. The memory requests may include read transactions that miss in the L2 cache 36 and for which no other agent responds exclusive (thus indicating that the agent at least has an equivalent copy to the copy in memory of the block addressed by the transaction, and may have a more up to date copy of the block). The memory requests may also include write transactions that miss in the L2 cache 36. A variety of information may be stored in each request buffer, as desired. Illustrated in FIG. 3 is the address of the transaction (Addr) and the TID of the transaction. The memory controller 14 may transmit the TID for read transactions on the data bus 22B with the data block to identify the data transfer of a transaction on the data bus 22B.

The control circuit 62 may generally allocate and deallocate request buffers to transactions as needed. Additionally, the control circuit 62 may handle the pended data cases (e.g. RdExc transactions for which the memory bridge 32 responds shared, indicating that a shared copy of the block was previously provided to at least one remote node, in the present embodiment). The control circuit 62 is thus coupled to receive the RSP lines 22C from the memory bridge 32, which indicate the state in other nodes of the block addressed by a transaction during the response phase of that transaction. For example, the RSP lines 22C may include an exclusive (EXC) line, which may be asserted by the memory bridge 32 to indicate that a remote node has an exclusive (modified) copy of the block, and a shared (SHD) line, which may be asserted by the memory bridge 32 to indicate that one or more remote nodes has a shared copy of the block. If neither line is asserted, then remote nodes do not have a copy of the block. Other coherent agents may include other response lines to provide a response during the response phase as well (not shown in FIG. 3). The other responses may be aggregated on a single set of response lines, or may be provided individually by each coherent agent, as desired. Additionally, the control circuit 62 is coupled to the F_TID bus 22D to receive the TID of a transaction which is data pended and the memory bridge 32 is indicating is permitted to transfer data. The control circuit 62 may compare the F_TID from the F_TID bus 22D to the TIDs stored in the request buffers 60 to detect that a given pended transaction may transfer data.

Figure 4:
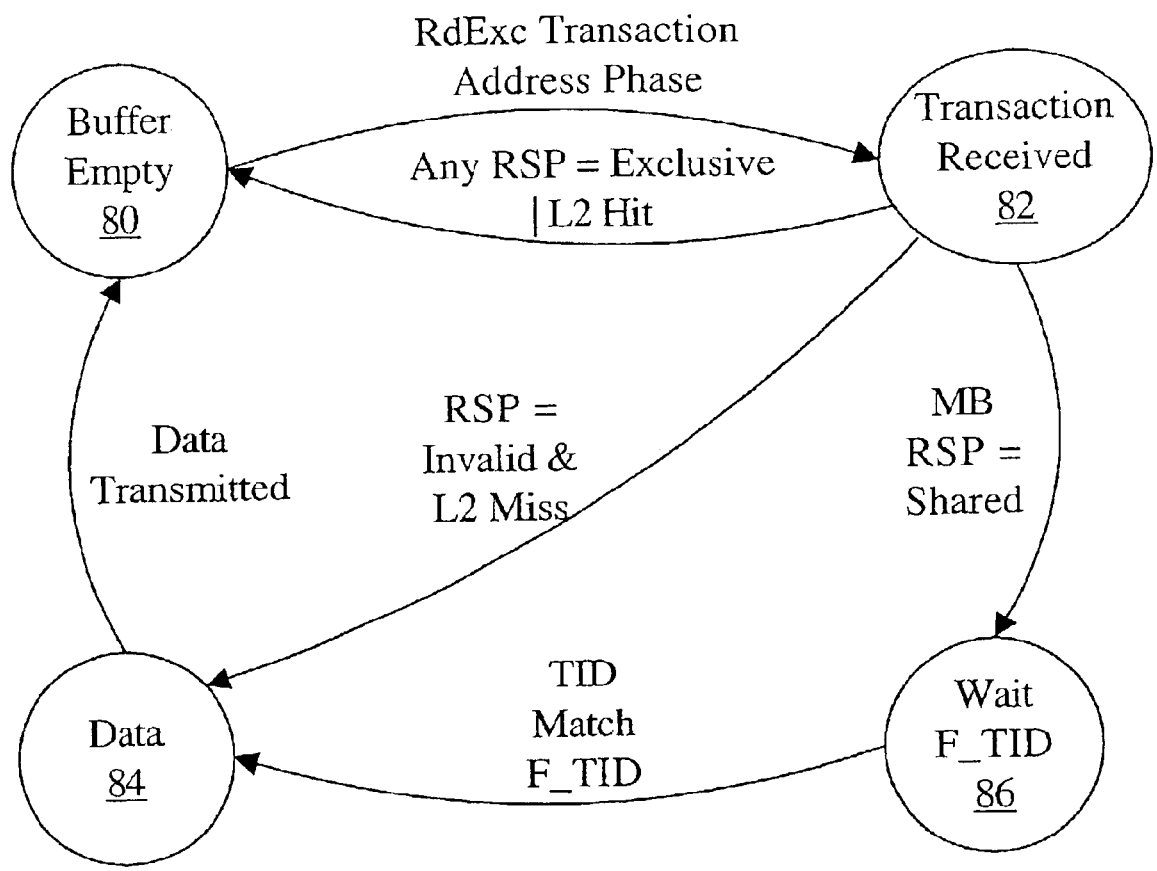
FIG. 4 is a block diagram of a state machine illustrating operation of one embodiment of a memory controller shown in FIG. 1.

FIG. 4 is a block diagram of one embodiment of a state machine that may be implemented by one embodiment of the control circuit 62 for each request buffer 60. That is, an independent state machine may be used for each request buffer 60. The state machine in FIG. 4 deals with operation for RdExc transactions (which may be data pended in the present embodiment). Additional states and/or state transitions may be used for other transaction types. The state machine is merely exemplary, any other mechanism/ circuitry may be used.

If the request buffer is not current storing a transaction, the state machine may be in a buffer empty state 80. In response to detecting the address phase of a RdExc transaction and the control circuit 62 allocating the request buffer for the transaction, the state machine may transition to a transaction received state 82. The state machine may remain in the transaction received state 82 until the response phase of the transaction. If any response (from any coherent agent in the node) is exclusive or the L2 cache 36 indicates a hit, the state machine may transition back to the buffer empty state 80 (since the agent responding exclusive will supply the data for the transaction). If the response from each coherent agent (including the memory bridge 32) is invalid and the L2 cache 36 indicates a miss, the state machine may transition from the transaction received state 82 to a data state 84. If the memory bridge 32 response is shared, the state machine may transition from the transaction received state 82 to the wait F_TID state 86. The control circuit 62 may compare the TID of the transaction in the request buffer to the F_TID transmitted on the F_TID bus 22D, and the state machine may transition from the wait F_TID state 86 to the data state 84 in response to the TID of the transaction matching the F_TID. The state machine may remain in the data state 84 until the memory controller 14 is prepared to transfer the data for the transaction (e.g. after reading the data from the memory 24) and has control of the data bus 22B to transfer the data (e.g. after winning a data bus arbitration). Once the data has been transmitted, the state machine may transition from the data state 84 to the buffer entry state 80.

The memory controller 14 detects the data pend case and delays the data transfer for a RdExc transaction until the memory bridge 32 indicates that the transaction is globally visible. For the embodiment of FIG. 4, the delay is illustrated via the wait F_TID state 86, entered in response to detecting the data pend case (the memory bridge 32 responding shared) and exited in response to an indication that the transaction is globally visible (the F_TID matching the TID of the transaction).

In one embodiment, the memory controller 14 may implement a coherency resolution pipeline. The coherency resolution pipeline may receive a transaction address phase, and may pipeline the transaction until the response phase occurs and the memory controller 14 determines if a request buffer is to be allocated for the request. In such an embodiment, the state machine shown in FIG. 4 may be modified to remove the transaction received state 82 (since the operation of this state occurs in the coherency resolution pipeline), and transitions from the buffer empty state 80 to the wait F_TID state 86 and data state 84 may be added similar to the same transitions from the transaction received state 82.

Returning to FIG. 3, the packet DMA circuit 16 is shown to include one or more WrInv buffers 64 and a control circuit 66 coupled to the WrInv buffers 64. The WrInv buffers 64 may each include the address of a block for which the packet DMA circuit 16 has request a WrInv transaction as well as the data comprising the updated block (the A/D field shown in FIG. 3). Each WrInv buffer 64 may further store the TID assigned by the packet DMA circuit 16 to the WrInv transaction. As mentioned above, the WrInv transaction is a transaction which updates the addressed block with new data, and does not first acquire exclusive access to the block. Other writes may be performed by first performing a RdExc transaction to obtain exclusive access to the block, modifying the block with the write data, and writing the modified block back to memory (if desired) using a write transaction (e.g. the Wr transaction for the embodiment illustrated in FIGS. 8–12).

The packet DMA circuit 16 may request a WrInv transaction, and may supply the address of the block and the data. The control circuit 66 may generally allocate and deallocate WrInv buffers for WrInv transactions, and may cause the WrInv transactions to be performed on the interconnect 22, including handling the data pended case (if it occurs). Thus, the control circuit 66 is coupled to receive the response information from the memory bridge 32 (to detect the data pend case) and the F_TID from the F_TID bus 22D (to detect that the data may be driven for a data pended WrInv transaction).

The packet DMA circuit 16 may perform WrInv transactions in response to receiving packet data to be written to memory, and the packet data occupies the entire block. Other coherent agents may also perform WrInv transactions. For example, the I/O bridge 40 includes one or more WrInv buffers 68 and a control circuit 70 which may be similar to the WrInv buffers 64 and control circuit 66. The I/O bridge 40 may perform WrInv transactions in response to receiving data from an I/O interface circuit 42 which occupies the entire block. For example, in one embodiment, an I/O interface circuit 42 may comprise an Ethernet MAC, and the data being written may be packet data. Any other I/O interface circuit 42 may cause a WrInv to be generated (e.g. a PCI interface receiving a PCI write or writes that occupy the entire block, etc.). The memory bridge 32 may also generate WrInv transactions in some embodiments. For example, the memory bridge 32 may generate WrInv transactions in response to receiving noncoherent HT write operations that update an entire block. The memory bridge 32 may include one or more WrInv buffers and a control circuit, similar to the WrInv buffers 64 and the control circuit 66 (illustrated in FIG. 3 as WrInv Buffer/Control 72).

Figure 5:
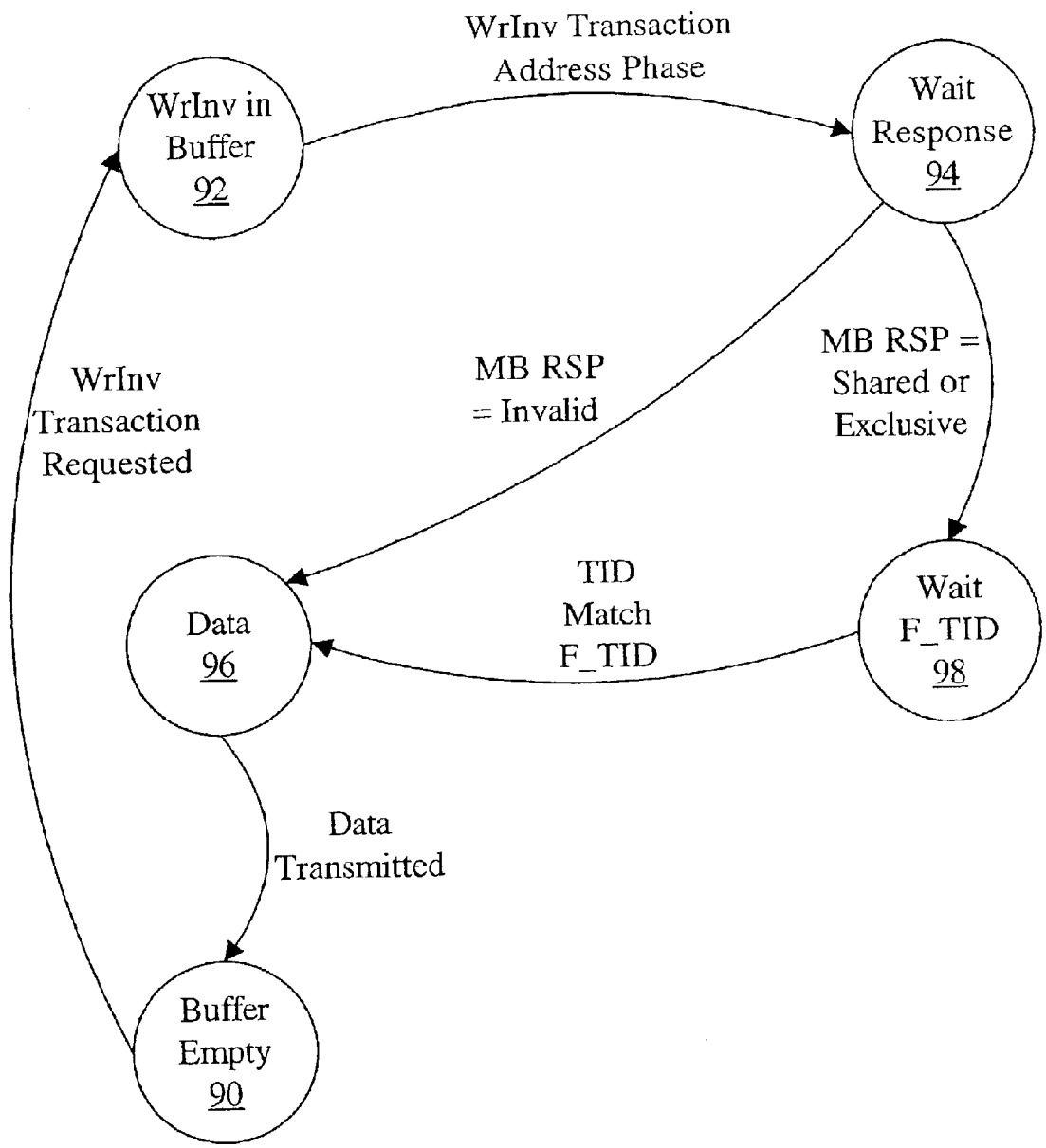
FIG. 5 is a block diagram of a state machine illustrating operation of one embodiment of an agent initiating a write invalidate transactions.

FIG. 5 is a block diagram of one embodiment of a state machine that may be implemented by one embodiment of any of the control circuits 66, 70 or 72 for each WrInv buffer. That is, an independent state machine may be used for each WrInv buffer. The state machine in FIG. 5 deals with operation for WrInv transactions (which may be data pended in the present embodiment). Additional states and/or state transitions may be used for other transaction types. The state machine is merely exemplary, any other mechanism/circuitry may be used.

If the WrInv buffer is empty, the state machine may be in the buffer empty state 90. In response to receiving a request for a WrInv transaction (and allocating the WrInv buffer to store the transaction), the state machine transitions to a WrInv in buffer state 92. The state machine may remain in the WrInv in buffer state 92 until the address phase of the WrInv transaction is successfully transmitted on the interconnect 22, in response to which the state machine may transition to the wait response state 94. Once the responses have been received in the response phase of the transaction, the state machine transitions to one of two states (the data state 96 or the wait F_TID state 98).

For the WrInv transaction, data may be pended if one or more remote nodes has a shared copy (indicated by a shared response from the memory bridge 32), similar to the RdExc transaction described above. Additionally, for the WrInv transaction, data may be pended if a remote node has a modified copy (indicated by an exclusive response from the memory bridge 32). In either case, the remote node or nodes may access stale copies of the block until the transaction is globally visible. Thus, for this embodiment, the state machine transitions to the wait F_TID state 98 in response to a shared or exclusive response from the memory bridge 32 and transitions to the data state 96 in response to an invalid response from the memory bridge 32. The state machine remains in the wait F_TID state 98 until an F_TID is received that matches the TID of the WrInv transaction, and then the state machine transitions to the data state 98. The state machine remains in the data state 96 until the data is successfully transmitted on the data bus 22B, and then the state machine transitions to the buffer empty state 90.

Thus, the data pend case is detected for the WrInv transaction by the initiating agent of the WrInv transaction (which is also the data source for the WrInv transaction) and the data transfer is delayed until the memory bridge 32 indicates that the transaction is globally visible. For the embodiment of FIG. 5, the delay is illustrated via the wait F_TID state 98, entered in response to detecting the data pend case and exited in response to an indication that the transaction is globally visible (the F_TID matching the TID of the transaction).

It is noted that, while WrInv buffers have been described for each of the packet DMA circuit 16, the I/O bridge 40, and the memory bridge 32, other embodiments may store other types of transactions in the buffers as well, if desired.

The memory bridge 32 has been described above as providing a response to transactions on the interconnect 22. Generally, a coherent agent may provide a response to a transaction (in the response phase of that transaction on the interconnect 22) indicating the state of the block addressed by the transaction in that coherent agent. The coherent agent may also make any state changes to the block as indicated by the transaction being performed. The memory bridge 32 tracks the state of blocks in remote nodes for which the node is the home node, and provides responses indicating the state of the block in the remote nodes for transactions accessing a block for which the node is the home node. In other words, the memory bridge 32 may generate responses on behalf of the remote nodes.

The memory bridge 32 may track the state of blocks for which the node 10 is the home node using the remote line directory (RLD) 34. Thus, the RLD 34 is coupled to receive the address of transactions on the address bus 22A and provides an indication of the state to a control circuit 74 coupled to the RLD 34. The control circuit 74 may generate the memory bridge 32's response to the transaction based, at least in part, on the contents of the RLD 34. Additionally, the memory bridge 32 may generate probes in response to a transaction on the interconnect 22 (including transactions sourced by the memory bridge 32 in response to coherency commands from other nodes) and may allocate one of one or more probe buffers 76 to store the probes for transmission to other nodes. The memory bridge 32 may update the RLD 34 in response to a transaction on the interconnect 22, to reflect the state changes to be performed in response to the probes as well as to reflect the state granted to an agent/node in response to the transaction.

Additionally, in some embodiments, the RLD 34 may be a cache having fewer entries than the number of blocks that may be remotely shared from the node 10. In response to a transaction which causes a block to be transmitted to a remote node and the block is not represented in the RLD 34, the RLD 34 may evict a block. Copies of the evicted block may be invalidated in the remote nodes using probes to the remote nodes. The probes may be stored in an entry of the probe buffers 76 in the memory bridge 32, and the probe buffers 76 may be used to count the probe acknowledgements, similar to the operation for probes generated to make a transaction globally visible. In order to detect a transaction addressing an evicted block for which the probes and probe acknowledgements are not complete, the probe buffers 76 may be snooped in response to transactions on the interconnect 22, and the response to the transaction generated by the control circuit 74 may take into account a hit in the probe buffers 76 as well as a hit in the RLD 34. That is, if probes have not been completed for an evicted block, the response generated by the control circuit 74 may indicate the state of the evicted block prior to the probes occurring.

A probe buffer entry is illustrated in FIG. 3, and may include a probe type field (T) which may indicate, for the embodiment of FIGS. 8–12, a Kill or a Flush probe), the address of the block for which the probes are generated (Addr), a count indicating the number of probe acknowledgements still outstanding for the probe (Cnt), the TID of the transaction that caused the probes, and a pend indication (P). For cases in which the transaction has been pended for completion of probes, the TID of the transaction may be stored in the TID field of the probe buffer entry allocated to the transaction. Additionally, the pend indication may be used to indicate whether or not a data pend is in progress for the transaction. If a data pend is in progress, the control circuit 74 is to provide the Ti) on the F_TID bus 22D in response to receiving the probe acknowledgements for the probes.

Figure 6:
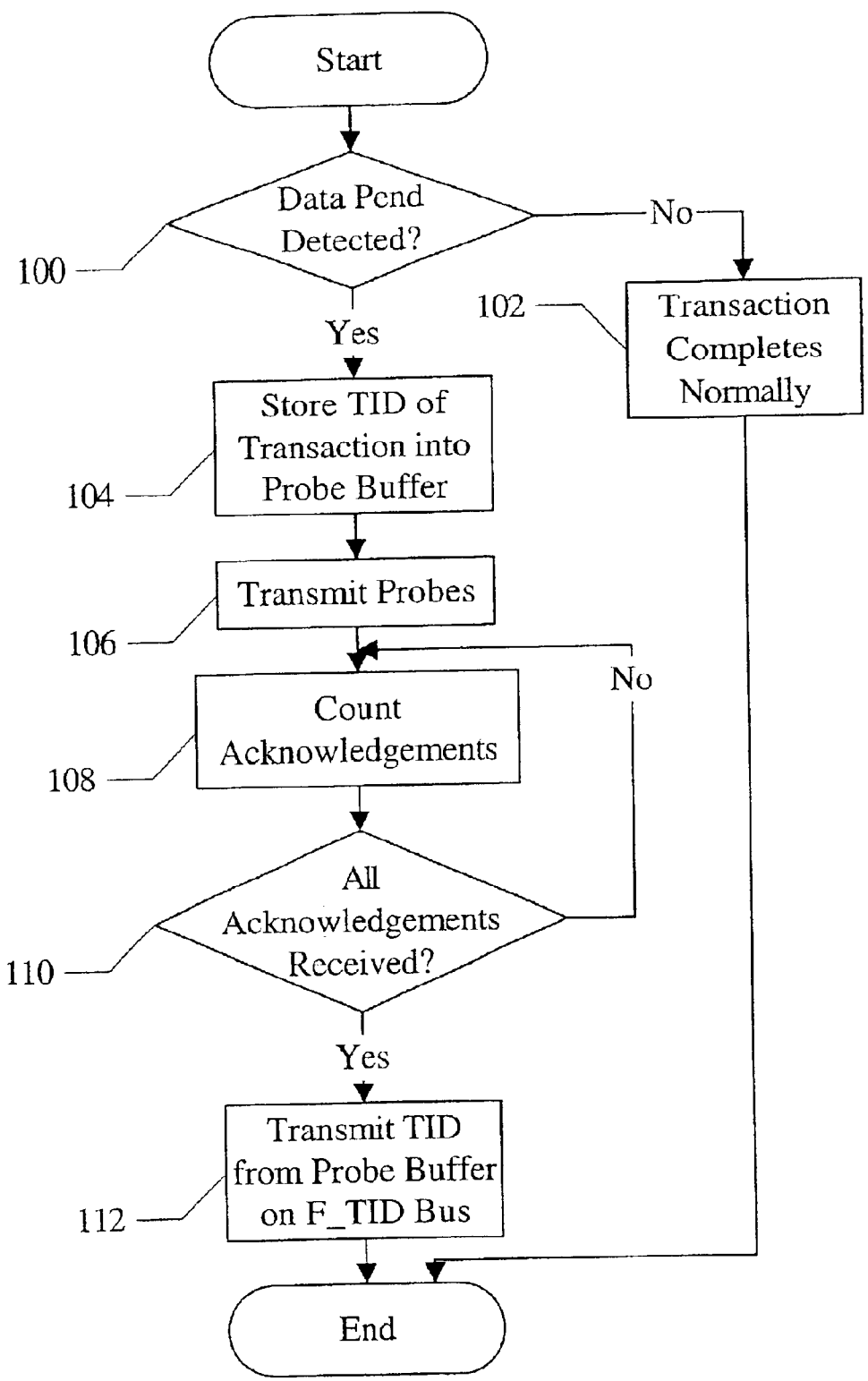
FIG. 6 is a flowchart illustrating operation of one embodiment of a memory bridge shown in FIG. 1.

FIG. 6 is a flowchart illustrating operation of one embodiment of the memory bridge 32 (and more particularly the control circuit 74) for completing a transaction for which a data pend has been detected. While the blocks are shown in a particular order in FIG. 6 for ease of understanding, any order may be used. Furthermore, blocks may be performed in parallel by the circuitry implemented in the memory bridge 32. Blocks may be pipelined over multiple clock cycles, as desired.

The control circuit 74 detects whether or not a data pend occurs for a transaction (decision block 100). If a data pend does not occur, the transaction completes normally (that is, without delaying the data transfer for the transaction) (block 102). If a data pend is detected, the control circuit 74 stores the TID of the transaction into the probe buffer entry allocated for the transaction (block 104). One or more probes are generated, and transmitted out of the node to the nodes having copies of the block (block 106). The control circuit 74 then waits for the probe acknowledgements corresponding to the probes (block 108 and decision block 110). For example, the control circuit 74 may initialize the count field to the number of expected acknowledgements, and may decrement the count for each received acknowledgement. When the count reaches zero, all probe acknowledgements have been received. Other embodiments may record the number of expected acknowledgements and may increment a counter for each received acknowledgement. Once all acknowledgements have been received, the control circuit 74 may transmit the TID from the probe buffer on the F_TID bus 22D, permitting the transfer of data for the transaction (block 112).

It is noted that, in various embodiments, one or more of the packet DMA circuit 16, the memory controller 14, the memory bridge 32, and the I/O bridge 40 may include various buffers and/or interconnect control logic between the illustrated control circuits and buffers for interfacing to the interconnect 22, as desired.

Figure 7:
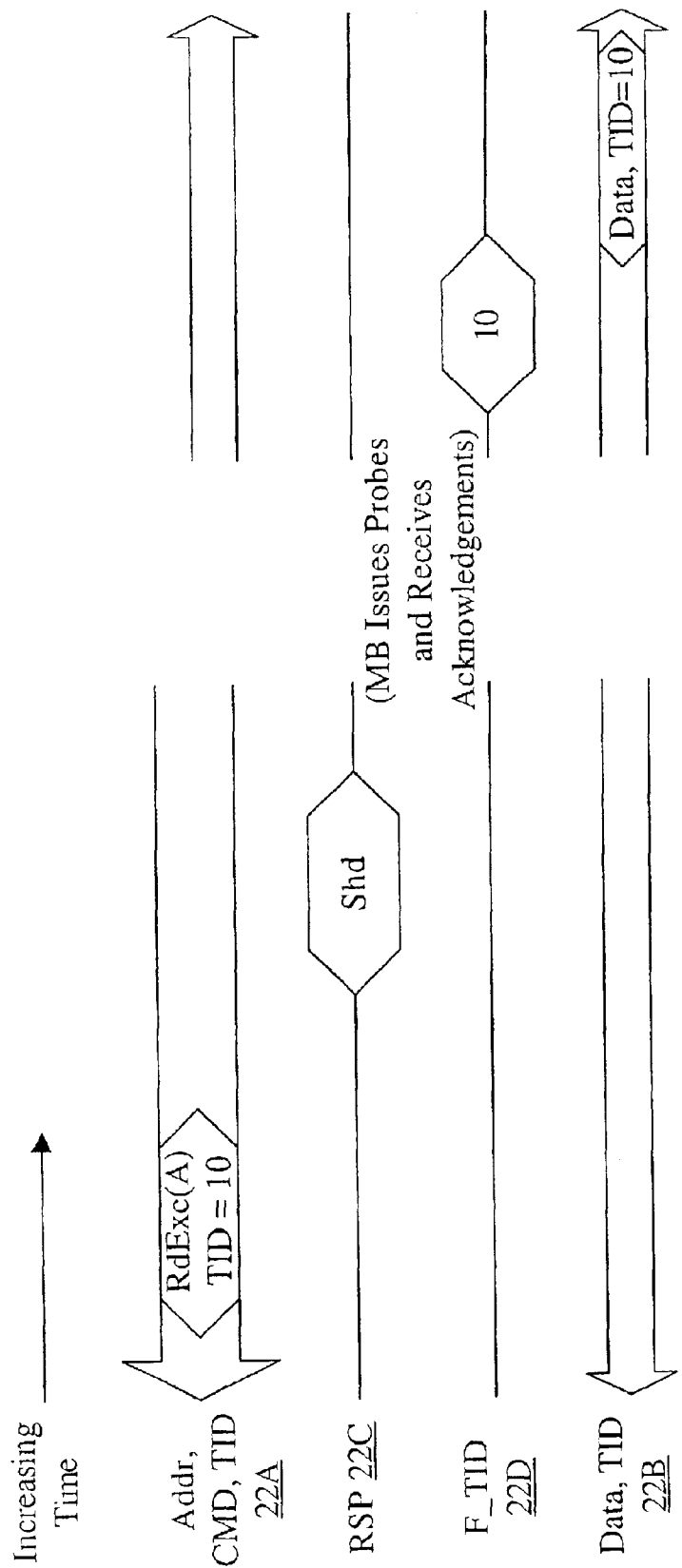
FIG. 7 is an example of a read exclusive transaction.

Turning next to FIG. 7, a timing diagram is shown illustrating one embodiment of a RdExc transaction to a block A. Time increases from left to right in FIG. 7.

An agent initiates the transaction on the address bus 22A, assigning a TID of 10 to the transaction. Subsequently, the response phase for the transaction occurs. The response from the memory bridge 32 is shared on the RSP lines 22C, indicating that the data is to be pended. The memory controller 14 (the data source for this transaction) detects the pended data case due to the memory bridge 32's shared response. The response phase may occur at any point after the address phase of the transaction, in various embodiments. The response phase may be a fixed or programmable time period after the address phase. In one embodiment, the response phase may be fixed at two bus clock cycles after the address phase.

While the transaction is data pended, the memory bridge 32 issues the probes to the sharing remote nodes and receives the acknowledgements. Once the acknowledgements have been received, the memory bridge 32 transmits the TID of the transaction ("10") on the F_TID bus 22D. The memory controller 14 receives the TI) from the F_TID bus 22D, and subsequently transmits the data with the TID equal to 10. It is noted that, if the memory controller 14 has not yet accessed the data from the memory 24 at the time that the TID is transmitted on the F_TID bus 22D, the transfer may be delayed further until the data is available for transfer.

A similar timing diagram may be applicable to a WrInv transaction, except that the same agent may source the address and the data of the transaction; Additionally, a response from the memory bridge 32 of either shared or exclusive may cause a data pend for the WrInv transaction. Additional CC-NUMA Details, One Embodiment FIGS. 8–12 illustrate one embodiment of a CC-NUMA coherency system that may be implemented by one embodiment of the node 10. Other embodiments may employ other CC-NUMA coherency systems or any other coherency system for a distributed memory system.

Turning next to FIG. 8, a table 142 is shown illustrating an exemplary set of transactions supported by one embodiment of the interconnect 22 and a table 144 is shown illustrating an exemplary set of coherency commands supported by one embodiment of the interfaces 30. Other embodiments including subsets, supersets, or alternative sets of commands may be used.

The transactions illustrated in the table 142 will next be described. An agent in the node 10 may read a cache block (either remote or local) using the read shared (RdShd) or read exclusive (RdExc) transactions on the interconnect 22. The RdShd transaction is used to request a shared copy of the cache block, and the RdExc transaction is used to request an exclusive copy of the cache block. If the RdShd transaction is used, and no other agent reports having a copy of the cache block during the response phase of the transaction (except for the L2 cache 36 and/or the memory controller 14), the agent may take the cache block in the exclusive state. In response to the RdExc transaction, other agents in the node invalidate their copies of the cache block (if any). Additionally, an exclusive (or modified) owner of the cache block may supply the data for the transaction in the data phase. Other embodiments may employ other mechanisms (e.g. a retry on the interconnect 22) to ensure the transfer of a modified cache block.

The write transaction (Wr) and the write invalidate transaction (WrInv) may be used by an agent to write a cache block to memory. The Wr transaction may be used by an owner having the modified state for the block, since no other copies of the block need to be invalidated. The WrInv transaction may be used by an agent that does not have exclusive ownership of the block (the agent may even have the invalid state for the block). The WrInv transaction causes other agents to invalidate any copies of the block, including modified copies. The WrInv transaction may be used by an agent that is writing the entire cache block. For example, a DMA that is writing the entire cache block with new data may use the transaction to avoid a read transaction followed by a write transaction. Particularly, the packet DMA circuit 16 may use WrInv transactions to write packet data to memory.

The RdKill and RdInv transactions may be used by the memory bridge 32 in response to probes received by the node 10 from other nodes. The RdKill and RdInv transactions cause the initiator (the memory bridge 32) to acquire exclusive access to the cache block and cause any cache agents to invalidate their copies (transferring data to the initiator similar to the RdShd and RdExc transactions). In one embodiment, the RdKill transaction also cancels a reservation established by the load-linked instruction in the MIPS instruction set, while the RdInv transaction does not. In other embodiments, a single transaction may be used for probes. In still other embodiments, there may be a probe-generated transaction that invalidates agent copies of the cache block (similar to the RdKill and RdInv transactions) and another probe-generated transaction that permits agents to retain shared copies of the cache block.

The WrFlush transaction is a write transaction which may be initiated by an agent and another agent may have an exclusive or modified copy of the block. The other agent provides the data for the WrFlush transaction, or the initiating agent provides the data if no other agent has an exclusive or modified copy of the block. The WrFlush transaction may be used, in one embodiment in which the L2 cache 36 retains the node state for the node 10 but other agents may have the cache block in a modified state as well. The L2 cache 36 may use the WrFlush command to evict a remote cache block which may be modified in a cache of another agent in the node 10.

The Nop transaction is a no-operation transaction. The Nop may be used if an agent is granted use of the interconnect 22 (e.g. the address bus, in embodiments in which the interconnect 22 is a split transaction bus) and the agent determines that it no longer has a transaction to run on the interconnect 22.

The commands illustrated in the table 144 will next be described. In the table 144, the command is shown as well as the virtual channel in which the command travels on the interfaces 30. The virtual channels may include, in the illustrated embodiment: the CRd virtual channel; the probe (Probe) virtual channel; the acknowledge (Ack) virtual channel; and coherent fill (CFill) virtual channel. The CRd, Probe, Ack, and CFill virtual channels are defined for the HTcc commands. There may be additional virtual channels for the standard HT commands (e.g. the non-posted command (NPC) virtual channel, the posted command (PC) virtual channel, and the response (RSP) virtual channel).

The cRdShd or cRdExc commands may be issued by the memory bridge 32 in response to RdShd or RdExc transactions on the interconnect 22, respectively, to read a remote cache block not stored in the node (or, in the case of RdExc, the block may be stored in the node but in the shared state). If the cache block is stored in the node (with exclusive ownership, in the case of the RdExc transaction), the read is completed on the interconnect 22 without any coherency command transmission by the memory bridge 32.

The Flush and Kill commands are probe commands for this embodiment. The memory bridge 32 at the home node of a cache block may issue probe commands in response to a cRdShd or cRdExc command. The memory bridge 32 at the home node of the cache block may also issue a probe command in response to a transaction for a local cache block, if one or more remote nodes has a copy of the cache block. The Flush command is used to request that a remote modified owner of a cache block return the cache block to the home node (and invalidate the cache block in the remote modified owner). The Kill command is used to request that a remote owner invalidate the cache block. In other embodiments, additional probe commands may be supported for other state change requests (e.g. allowing remote owners to retain a shared copy of the cache block).

The probe commands are responded to (after effecting the state changes requested by the probe commands) using either the Kill_Ack or WB commands. The Kill_Ack command is an acknowledgement that a Kill command has been processed by a receiving node. The WB command is a write back of the cache block, and is transmitted in response to the Flush command. The WB command may also be used by a node to write back a remote cache block that is being evicted from the node.

The Fill command is the command to transfer data to a remote node that has transmitted a read command (cRdExc or cRdShd) to the home node. The Fill command is issued by the memory bridge 32 in the home node after the probes (if any) for a cache block have completed.

Figure 9:
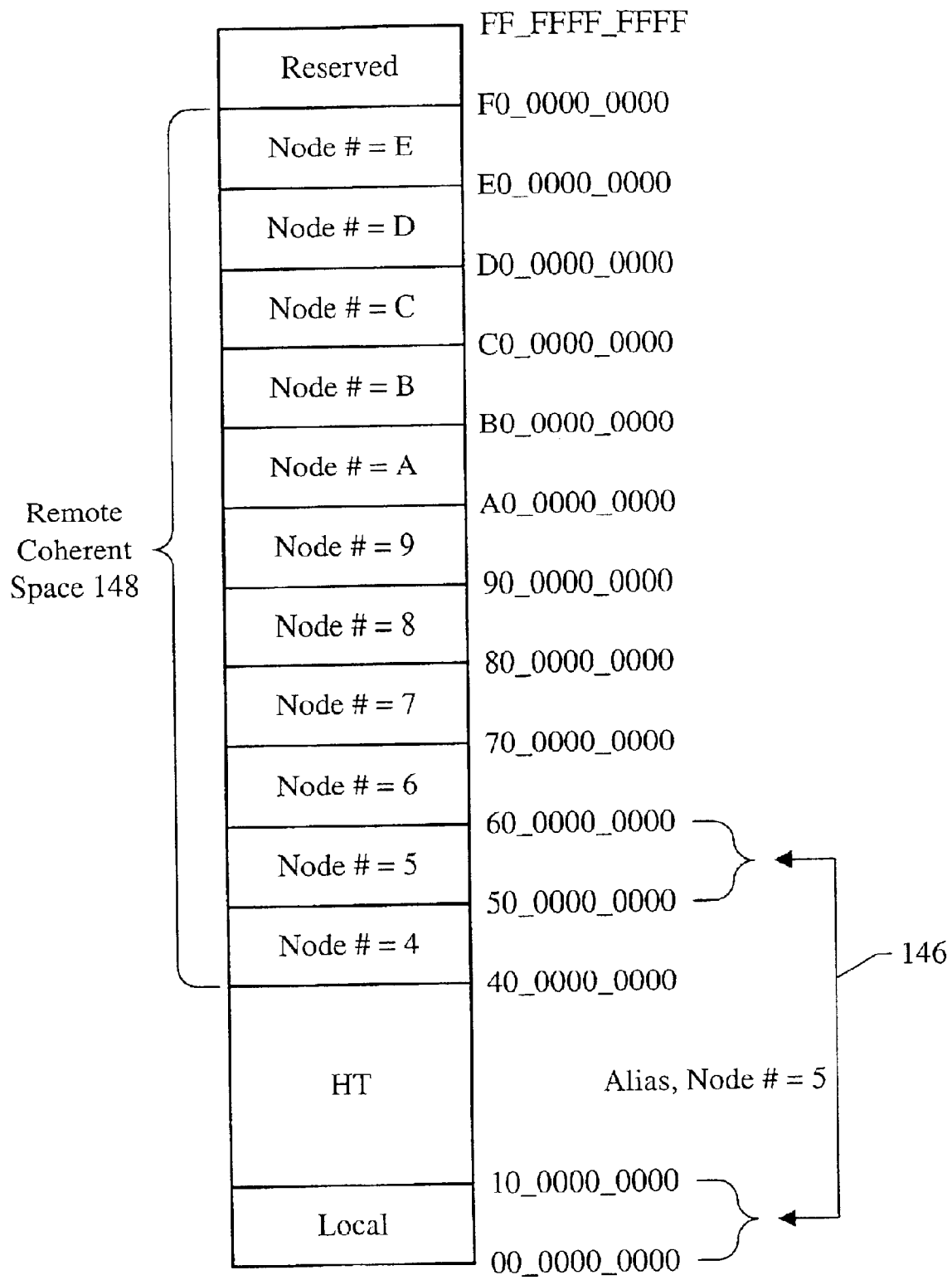
FIG. 9 is a block diagram of an address space supported by one embodiment of the node shown in FIG. 1.

Turning next to FIG. 9, a block diagram illustrating one embodiment of an address space implemented by one embodiment of the node 10 is shown. Addresses shown in FIG. 9 are illustrated as hexadecimal digits, with an under bar ("_") separating groups of four digits. Thus, in the embodiment illustrated in FIG. 9, 40 bits of address are supported. In other embodiments, more or fewer address bits may be supported.

In the embodiment of FIG. 9, the address space between 00_0000_0000 and 0F_FFFF_FFFF is treated as local address space. Transactions generated by agents in the local address space do not generate coherency commands to other nodes, although coherency may be enforced within the node 10 for these addresses. That is, the local address space is not maintained coherent with other nodes. Various portions of the local address space may be memory mapped to I/O devices, HT, etc. as desired.

The address space between 40_0000_0000 and EF_FFFF_FFFF is the remote coherent space 148. That is, the address space between 40_0000_0000 and EF_FFFF_FFFF is maintained coherent between the nodes. Each node is assigned a portion of the remote coherent space, and that node is the home node for the portion. As shown in FIG. 1, each node is programmable with a node number. The node number is equal to the most significant nibble (4 bits) of the addresses for which that node is the home node, in this embodiment. Thus, the node numbers may range from 4 to E in the embodiment shown. Other embodiments may support more or fewer node numbers, as desired. In the illustrated embodiment, each node is assigned a 64 Gigabyte (GB) portion of the memory space for which it is the home node. The size of the portion assigned to each node may be varied in other embodiments (e.g. based on the address size or other factors).

For a given coherent node, there is an aliasing between the remote coherent space for which that node is the home node and the local address space of that node. That is, corresponding addresses in the local address space and the portion of the remote coherent space for which the node is the home node access the same memory locations in the memory 24 of the node (or are memory mapped to the same I/O devices or interfaces, etc.). For example, the node having node number 5 aliases the address space 50_0000_0000 through 5F_FFFF_FFFF to 00_0000_0000 through 0F_FFFF_FFFF respectively (arrow 146). Internode coherent accesses to the memory 24 at the node 10 use the node-numbered address space (e.g. 50_0000_0000 to 5F_FFFF_FFFF, if the node number programmed into node 10 is 5) to access cache blocks in the memory 24. That is, agents in other nodes and agents within the node that are coherently accessing cache blocks in the memory use the remote coherent space, while access in the local address space are not maintained coherent with other nodes (even though the same cache block may be accessed). Thus the addresses are aliased, but not maintained coherent, in this embodiment. In other embodiments, the addresses in the remote coherent space and the corresponding addresses in the local address space may be maintained coherent.

A cache block is referred to as local in a node if the cache block is part of the memory assigned to the node (as mentioned above). Thus, the cache block may be local if it is accessed from the local address space or the remote coherent space, as long as the address is in the range for which the node is the home node. Similarly, a transaction on the interconnect 22 that accesses a local cache block may be referred to as a local transaction or local access. A transaction on the interconnect 22 that accesses a remote cache block (via the remote coherent address space outside of the portion for which the node is the home node) may be referred to as a remote transaction or a remote access.

The address space between 10_0000_0000 and 3F_FFFF_FFFF may be used for additional HT transactions (e.g. standard HT transactions) in the illustrated embodiment. Additionally, the address space between F0_0000_0000 and FF_FFFF_FFFF may be reserved in the illustrated embodiment.

It is noted that, while the most significant nibble of the address defines which node is being accessed, other embodiments may use any other portion of the address to identify the node. Furthermore, other information in the transaction may be used to identify remote versus local transactions, in other embodiments (e.g. command type, control information transmitted in the transaction, etc.).

Figure 10:
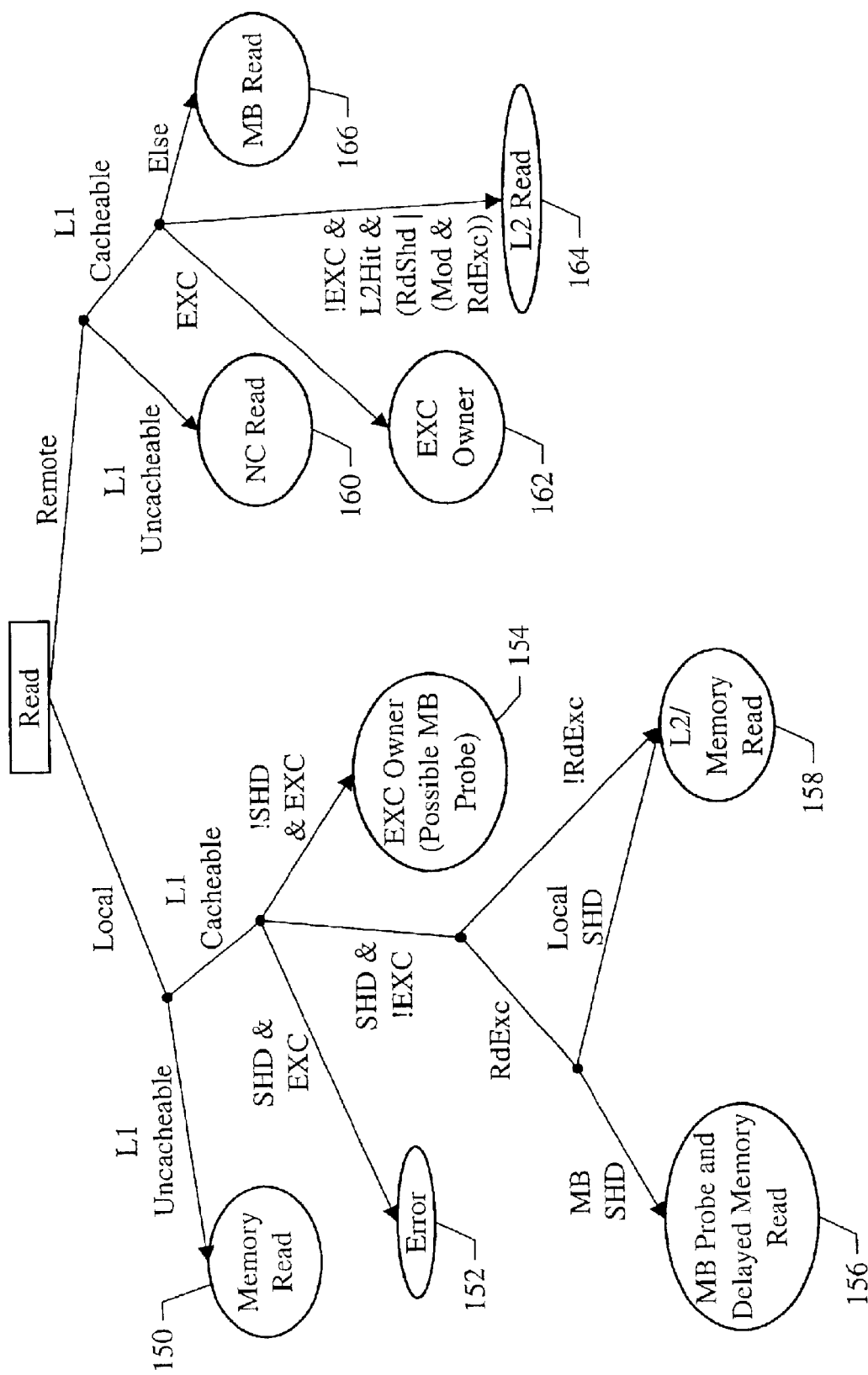
FIG. 10 is a decision tree illustrating operation of one embodiment of a node for a read transaction on the interconnect within the node.

Turning next to FIG. 10, a decision tree for a read transaction to a memory space address on the interconnect 22 of a node 10 is shown for one embodiment. The decision tree may illustrate operation of the node 10 for the read transaction for different conditions of the transaction, the state of the cache block accessed by the transaction, etc. The read transaction may, in one embodiment, include the RdShd, RdExc, RdKill, and RdInv transactions shown in the table 142 of FIG. 8. Each dot on the lines within the decision tree represents a divergence point of one or more branches of the tree, which are labeled with the corresponding conditions. Where multiple branches emerge from a dot, taking one branch also implies that the conditions for the other branches are not met. In FIG. 10, the exclamation point ("!") is used to indicate a logical NOT. Not shown in FIG. 10 is the state transition made by each coherent agent which is caching a copy of the cache block for the read transaction. If the read transaction is RdShd, the coherent agent may retain a copy of the cache block in the shared state. Otherwise, the coherent agent invalidates its copy of the cache block.

The transaction may be either local or remote, as mentioned above. For local transactions, if the transaction is uncacheable, then a read from the memory 24 is performed (reference numeral 150). In one embodiment, the transaction may include an indication of whether or not the transaction is cacheable. If the transaction is uncacheable, it is treated as a non-coherent transaction in the present embodiment.

If the local transaction is cacheable, the operation of the node 10 is dependent on the response provided during the response phase of the transaction. In one embodiment, each coherent agent responds with the state of the cache block in that agent. For example, each coherent agent may have an associated shared (SHD) and exclusive (EXC) signal. The agent may signal invalid state by deasserting both the SHD and EXC signals. The agent may signal shared state by asserting the SHD signal and deasserting the EXC signal. The agent may signal exclusive state (or modified state) by asserting the EXC signal and deasserting the SHD signal. The exclusive and modified states may be treated the same in the response phase in this embodiment, and the exclusive/modified owner may provide the data. The exclusive/modified owner may provide, concurrent with the data, an indication of whether the state is exclusive or modified. While each agent may have its own SHD and EXC signals in this embodiment (and the initiating agent may receive the signals from each other agent), in other embodiments a shared SHD and EXC signal may be used by all agents.

If both the SHD and EXC responses are received for the local transaction, an error has occurred (reference numeral 152). The memory controller may return a fatal error indication for the read transaction, in one embodiment. If the response is exclusive (SHD deasserted, EXC asserted), the exclusive owner provides the data for the read transaction on the interconnect 22 (reference numeral 154). If the exclusive owner is the memory bridge 32 (as recorded in the remote line directory 34), then a remote node has the cache block in the modified state. The memory bridge 32 issues a probe (Flush command) to retrieve the cache block from that remote node. The memory bridge 32 may supply the cache block returned from the remote node as the data for the read on the interconnect 22.

If the response is shared (SHD asserted, EXC deasserted), the local transaction is RdExc, and the memory bridge 32 is one of the agents reporting shared, then at least one remote node may have a shared copy of the cache block. The memory bridge 32 may initiate a probe (Kill command) to invalidate the shared copies of the cache block in the remote node(s) (reference numeral 156). In one embodiment, the data may be read from memory (or the L2 cache 36) for this case, but the transfer of the data may be delayed until the remote node(s) have acknowledged the probe. The memory bridge 32 may signal the memory controller 14/L2 cache 36 when the acknowledgements have been received. In one embodiment, each transaction may have a transaction identifier on the interconnect 22. The memory bridge 32 may transmit the transaction identifier of the RdExc transaction to the memory controller 14/L2 cache 36 to indicate that the data may be transmitted.

If the response is shared, the local transaction is RdExc, and the sharing agents are local agents (i.e. the memory bridge 32 does not report shared), then the L2 cache 36 or the memory controller 14 may supply the data, depending on whether or not there is an L2 hit for the cache block (reference numeral 158). Similarly, if the response is shared and the transaction is not RdExc, the L2 cache 36 or the memory controller 14 may supply the data dependent on whether or not there is an L2 hit for the cache block.

If the transaction is remote and uncacheable, then the memory bridge 32 may generate a noncoherent read command on the interfaces 30 to read the data. For example, a standard HT read command may be used (reference numeral 160). If the remote transaction is cacheable and the response on the interconnect 22 is exclusive, then the exclusive owner supplies the data for the read (reference numeral 162). If the remote transaction is cacheable, the response is not exclusive, the cache block is an L2 cache hit, and the transaction is either RdShd or the transaction is RdExc and the L2 cache has the block in the modified state, then the L2 cache 36 supplies the data for the read (reference numeral 164). Otherwise, the memory bridge 32 initiates a corresponding read command to the home node of the cache block (reference numeral 166).

Figure 11:
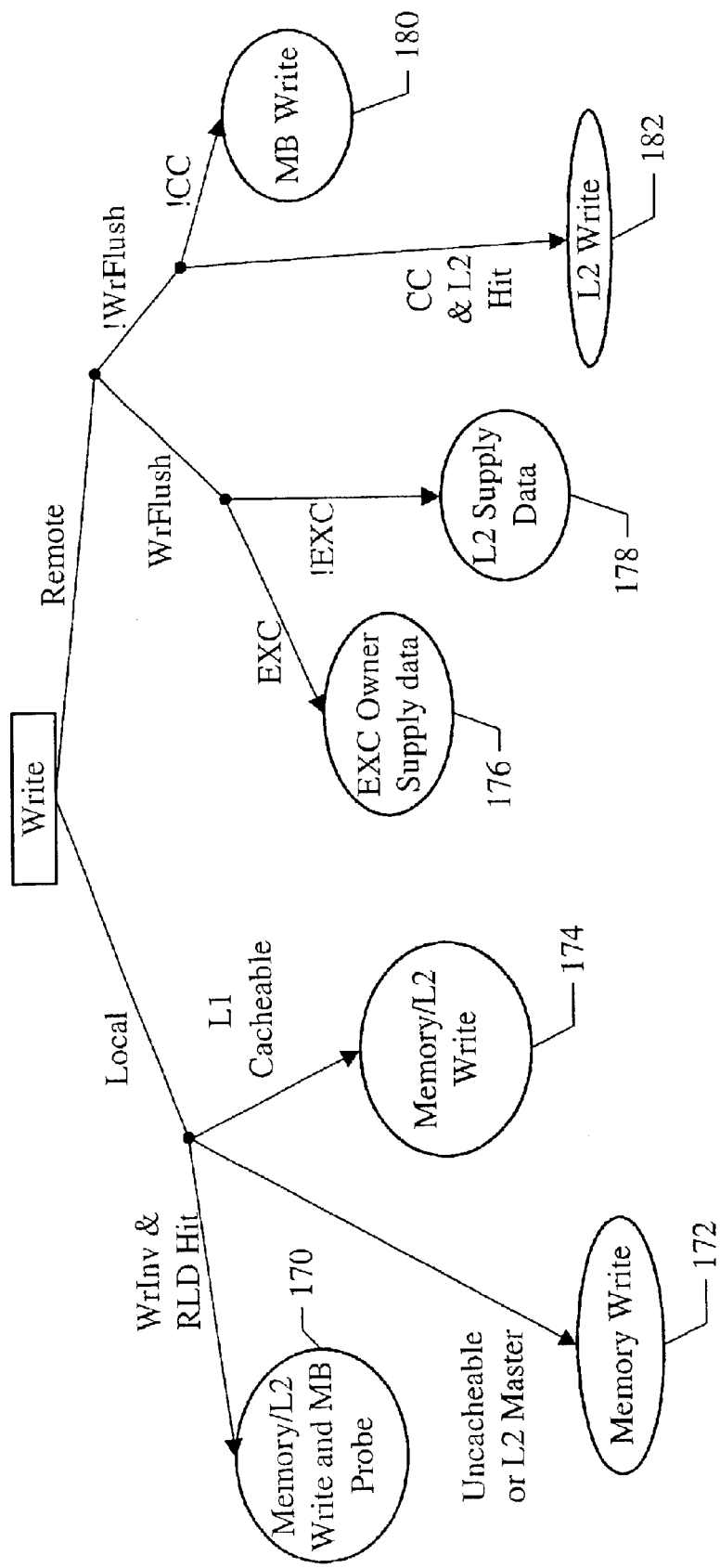
FIG. 11 is a decision tree illustrating operation of one embodiment of a node for a write transaction on the interconnect within the node.

Turning next to FIG. 11, a decision tree for a write transaction to a memory space address on the interconnect 22 of a node 10 is shown for one embodiment. The decision tree may illustrate operation of the node for the write transaction for different conditions of the transaction, the state of the cache block accessed by the transaction, etc. The write transaction may, in one embodiment, include the Wr, WrInv, and WrFlush transactions shown in the table 142 of FIG. 8. Each dot on the lines within the decision tree represents a divergence point of one or more branches of the tree, which are labeled with the corresponding conditions. Where multiple branches emerge from a dot, taking one branch also implies that the conditions for the other branches are not met. In FIG. 11, the exclamation point ("!") is used to indicate a logical NOT. Not shown in FIG. 11 is the state transition made by each coherent agent which is caching a copy of the cache block for the write transaction. The coherent agent invalidates its copy of the cache block.

If the transaction is a local transaction, and the transaction is a WrInv transaction that hits in the remote line directory 34 (i.e. a remote node is caching a copy of the cache block), the memory controller 14 (and the L2 cache 36, if an L2 hit) updates with the write data (reference numeral 170). Additionally, the memory bridge 32 may generate probes to the remote nodes indicated by the remote line directory 34. The update of the memory/L2 cache may be delayed until the probes have been completed, at which time the memory bridge 32 may transmit the transaction identifier of the WrInv transaction to the L2 cache 36/memory controller 14 to permit the update.

If the local transaction is uncacheable or if the L2 cache 36 is the master of the transaction (that is, the L2 cache 36 initiated the transaction), then the memory controller 14 updates with the data (reference numeral 172). If the local transaction is cacheable, the memory controller 14 and/or the L2 cache 36 updates with the data based on whether or not there is an L2 cache hit (and, in some embodiments, based on an L2 cache allocation indication in the transaction, which allows the source of the transaction to indicate whether or not the L2 cache allocates a cache line for an L2 cache miss) (reference numeral 174).

If the transaction is a remote transaction, the transaction is a WrFlush transaction, and the response to the transaction is exclusive, the exclusive owner supplies the data (reference numeral 176). If the remote WrFlush transaction results in a non-exclusive response (shared or invalid), the L2 cache 36 supplies the data of the WrFlush transaction (reference numeral 178). In one embodiment, the L2 cache 36 retains the state of the node as recorded in the home node, and the L2 cache 36 uses the WrFlush transaction to evict a remote cache block which is in the modified state in the node. Thus, if another agent has the cache block in the exclusive state, that agent may have a more recent copy of the cache block that should be returned to the home node. Otherwise, the L2 cache 36 supplies the block to be returned to the home node. In either case, the memory bridge 32 may capture the WrFlush transaction and data, and may perform a WB command to return the cache block to the home node.

If the remote transaction is not a WrFlush transaction, and is not cache coherent, the memory bridge 32 receives the write transaction and performs a non coherent write command (e.g. a standard HIT write command) to transmit the cache block to the home node (reference numeral 180). If the remote transaction is not a WrFlush transaction, is cache coherent, and is an L2 hit, the L2 cache 36 may update with the data (reference numeral 182). Such a transaction may occur, e.g., if a processor 12A–12N is evicting a cache block, in which case the L2 cache 36 is updating with the more recent copy of the cache block from the processor.

Figure 12:
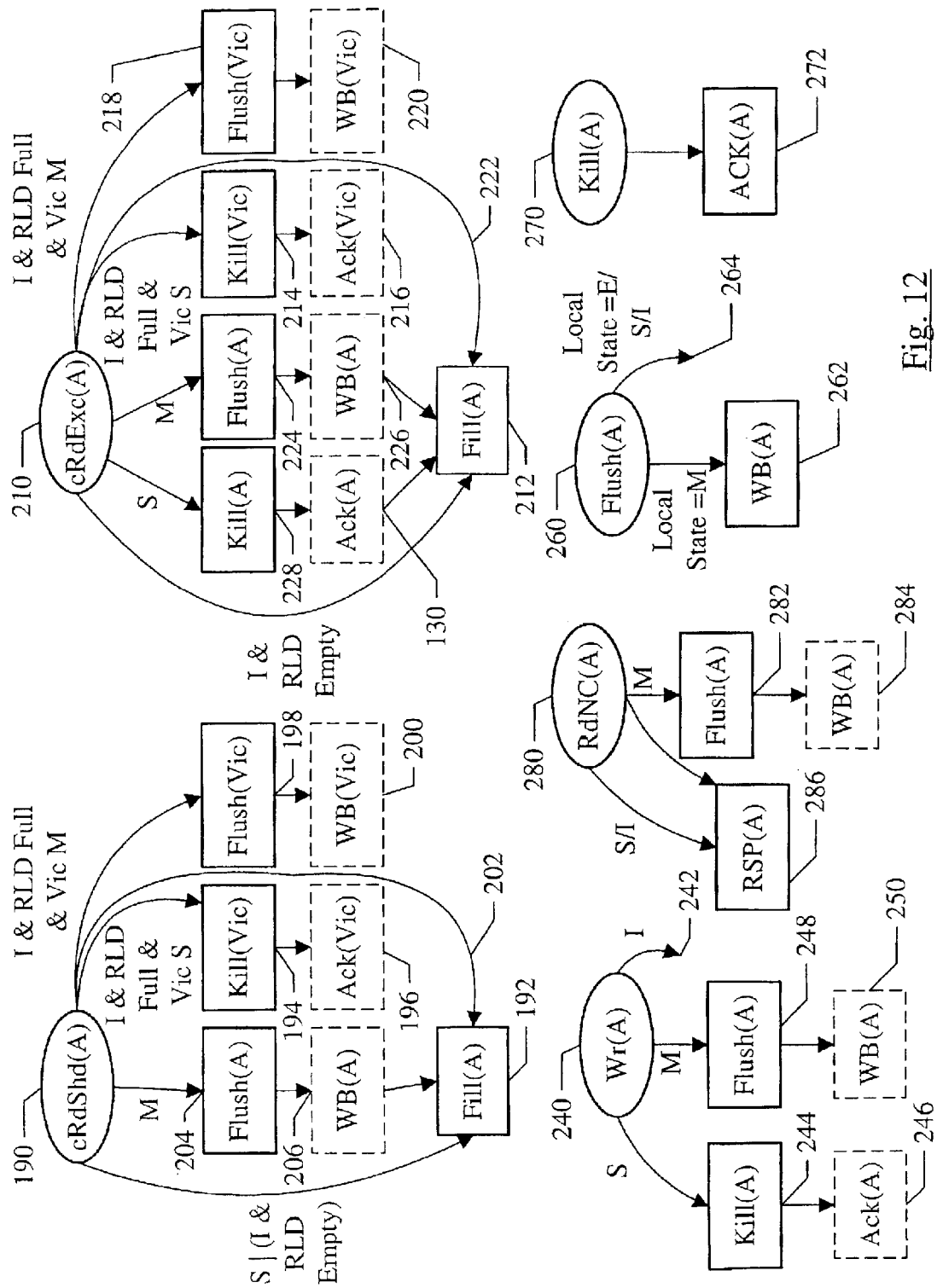
FIG. 12 is a diagram illustrating operation of one embodiment of the memory bridge for remote coherency commands received by the memory bridge.

Turning next to FIG. 12, a block diagram illustrating operation of one embodiment of the memory bridge 32 in response to various coherency commands received from the interface circuits 20A–20C is shown. The received command is shown in an oval. Commands initiated by the memory bridge 32 in response to the received command (and the state of the affected cache block as indicated in the remote line directory 34) are shown in solid boxes. Dotted boxes are commands received by the memory bridge 32 in response to the commands transmitted in the preceding solid boxes. The cache block affected by a command is shown in parentheses after the command.

In one embodiment, the remote line directory 34 may be accessed in response to a transaction on the interconnect 22. In such an embodiment, the memory bridge 32 may initiate a transaction on the interconnect 22 in response to certain coherent commands in order to retrieve the remote line directory 34 (as well as to affect any state changes in the coherent agents coupled to the interconnect 22, if applicable). In other embodiments, the memory bridge 32 may be configured to read the remote line directory 34 prior to generating a transaction on the interconnect 22, and may conditionally generate a transaction if needed based on the state of the remote line directory 34 for the requested cache block. Additionally, in one embodiment, the remote line directory 34 may maintain the remote state for a subset of the local cache blocks that are shareable remotely (e.g. a subset of the portion of the remote coherent space 148 that is assigned to the local node). If a cache block is requested by a remote node using a coherency command and there is no entry in the remote line directory 34 for the cache block, then a victim cache block may be replaced in the remote line directory 34 (and probes may be generated to invalidate the victim cache block in remote nodes). In other embodiments, the remote line directory 34 may be configured to track the state of each cache block in the portion of the remote coherent space 148 that is assigned to the local node. In such embodiments, operations related to the victim cache blocks may be omitted from FIG. 12.

For a cRdShd command for cache block "A" received by the memory bridge 32 (reference numeral 190), the memory bridge 32 may generate a RdShd transaction on the interconnect 22. Based on the remote line directory (RLD) state for the cache block A, a number of operations may occur. If the RLD state is shared, or invalid and there is an entry available for allocation without requiring a victim cache block to be evicted ("RLD empty" in FIG. 12), then the memory bridge 32 may transmit a fill command to the remote node with the data supplied to the memory bridge 32 in response to the RdShd transaction on the interconnect 22 (reference numeral 192). On the other hand, if the RLD state is invalid and an eviction of a victim block is used to free an RLD entry for cache block A, then the memory bridge 32 may transmit probes to the remote nodes having copies of the victim cache block. If the victim cache block is shared, the memory bridge 32 may transmit a Kill command (or commands, if multiple nodes are sharing the victim cache block) for the victim block (reference numeral 194). The remote nodes respond with Kill_Ack commands for the victim block (reference numeral 196). If the victim block is modified, the memory bridge 32 may transmit a Flush command to the remote node having the modified state (reference numeral 198). The remote node may return the modified block with a WB command (reference numeral 200). In either case of evicting a victim block, the memory bridge 32 may, in parallel, generate a Fill command for the cache block A (reference numeral 192, via arrow 202). Finally, if the RLD state is modified for the cache block A, the memory bridge 32 may generate a Flush command for the cache block A to the remote node (reference numeral 204), which responds with a WB command and the cache block A (reference numeral 206). The memory bridge 32 may then transmit the Fill command with the cache block A provided via the write back command (reference numeral 192).

In response to a cRdExc command for a cache block A (reference numeral 210), operation may be similar to the cRdShd case for some RLD states. Similar to the cRdShd case, the memory bridge 32 may initiate a RdExc transaction on the interconnect 22 in response to the cRdExc command. Similar to the cRdShd case, if the RLD is invalid and no eviction of a victim cache block is needed in the RLD to allocate an entry for the cache block A, then the memory bridge 32 may supply the cache block supplied on the interconnect 22 for the RdExc transaction in a fill command to the remote node (reference numeral 212). Additionally, if the RLD state is invalid for the cache block A and a victim cache block is evicted from the RLD 34, the memory bridge 32 may operate in a similar fashion to the cRdShd case (reference numerals 214 and 216 and arrow 222 for the shared case of the victim block and reference numerals 218 and 220 and arrow 222 for the modified case of the victim block). If the RLD state is modified for the cache block A, the memory bridge 32 may operate in a similar fashion to the cRdShd case (reference numerals 224 and 226). If the RLD state is shared for the cache block A, the memory bridge 32 may generate Kill commands for each remote sharing node (reference numeral 228). The memory bridge 32 may wait for the Kill_Ack commands from the remote sharing nodes (reference numeral 230), and then transmit the Fill command with the cache block A provided on the interconnect 22 in response to the RdExc transaction (reference numeral 212).

In response to an HT Wr command to the cache block A (reference numeral 240), the memory bridge 32 may generate a Wr transaction on the interconnect 22. If the RLD state is invalid for the cache block A, the memory bridge 32 may transmit the write data on the interconnect 22 and the Wr command is complete (reference numeral 242). If the RLD state is shared for the cache block A, the memory bridge 32 may generate Kill commands to each remote sharing node (reference numeral 244) and collect the Kill_Ack commands from those remote nodes (reference numeral 246) in addition to transmitting the data on the interconnect 22. If the RLD state is modified for a remote node, the memory bridge 32 may generate a Flush command to the remote node (reference numeral 248) and receive the WB command from the remote node (reference numeral 250). In one embodiment, the memory bridge 32 may delay transmitting the write data on the interconnect 22 until the WB command or Kill_Ack commands are received (although the data returned with the WB command may be dropped by the memory bridge 32).

The above commands are received by the memory bridge 32 for cache blocks for which the node 10 including the memory bridge 32 is the home node. The memory bridge 32 may also receive Flush commands or Kill commands for cache blocks for which the node 10 is a remote node. In response to a Flush command to the cache block A (reference numeral 260), the memory bridge 32 may initiate a RdInv transaction on the interconnect 22. If the local state of the cache block is modified, the memory bridge 32 may transmit a WB command to the home node, with the cache block supplied on the interconnect 22 in response to the RdInv transaction (reference numeral 262). If the local state of the cache block is not modified, the memory bridge 32 may not respond to the Flush command (reference numeral 264). In this case, the node may already have transmitted a WB command to the home node (e.g. in response to evicting the cache block locally). In response to a Kill command to the cache block A (reference numeral 270), the memory bridge 32 may initiate a RdKill transaction on the interconnect 22. The memory bridge 32 may respond to the Kill command with a Kill_Ack command (reference numeral 272).

In one embodiment, the memory bridge 32 may also be configured to receive a non-cacheable read (RdNC) command (e.g. corresponding to a standard HT read) (reference numeral 280). In response, the memory bridge 32 may initiate a RdShd transaction on the interconnect 22. If the RLD state is modified for the cache block including the data to be read, the memory bridge 32 may transmit a Flush command to the remote node having the modified cache block (reference numeral 282), and may receive the WB command from the remote node (reference numeral 284). Additionally, the memory bridge 32 may supply data received on the interconnect 22 in response to the RdShd transaction as a read response (RSP) to the requesting node (reference numeral 286).

Computer Accessible Medium

Figure 13:
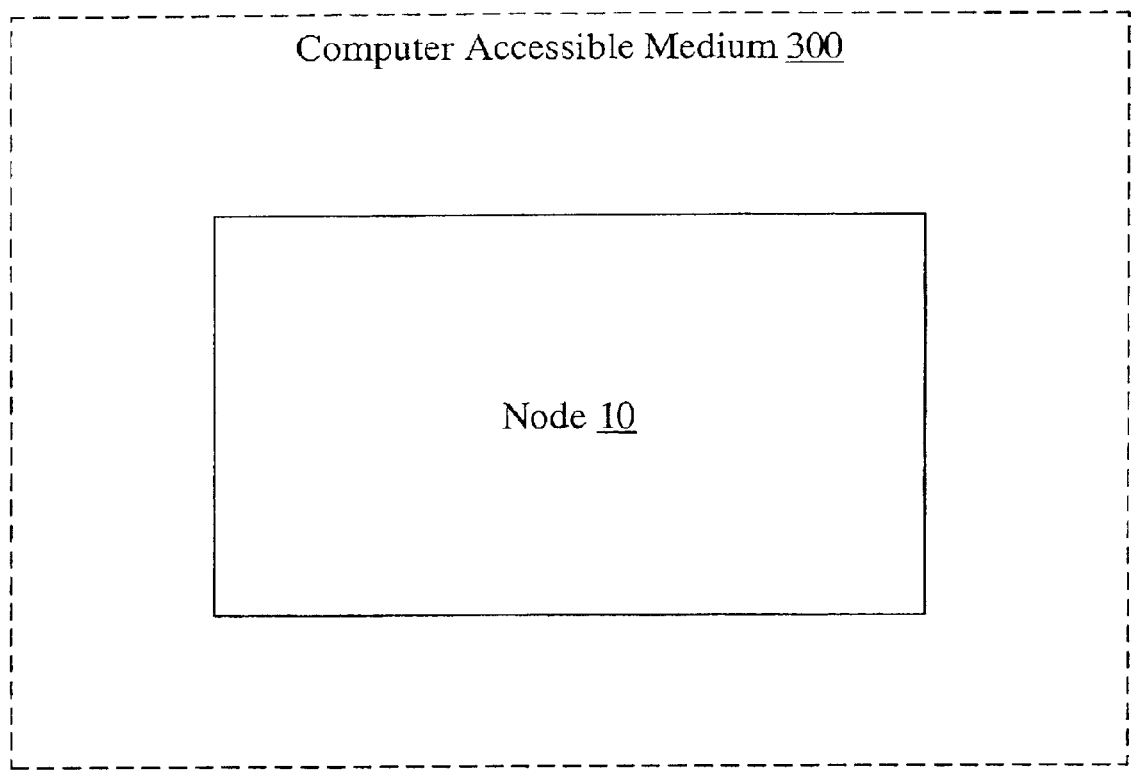
FIG. 13 is a block diagram of one embodiment of a computer accessible medium.

Turning next to FIG. 13, a block diagram of a computer accessible medium 300 including one or more data structures representative of the circuitry included in the node 10 is shown. Generally speaking, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer accessible medium 300 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium 300 may be the netlist(s) (with or without the synthesis library) or the data set(s), as desired. In yet another alternative, the data structures may comprise the output of a schematic program, or netlist(s) or data set(s) derived therefrom.

While computer accessible medium 300 includes a representation of the node 10, other embodiments may include a representation of any portion of the node 10 (e.g. processors 12A–12N, memory controller 14, L2 cache 36, interconnect 22, memory bridge 32 (or portions thereof), remote line directory 34, switch 18, packet DMA circuit 16, interface circuits 20A–20C (or portions thereof), etc.).

Numerous variations and modifications will become apparent to those skilled in the art once the above disclosure is fully appreciated. It is intended that the following claims be interpreted to embrace all such variations and modifications.

What is claimed is:

1. A node comprising:
   an interconnect;
   a transaction initiating circuitry coupled to the interconnect to initiate a transaction on the interconnect, the transaction addressing a cache coherent block of data in which a transaction identifier is associated with the transaction; and
   a memory bridge coupled to the interconnect and to interface circuits that communicate with other nodes, the memory bridge including a directory to track local cache blocks residing in remote nodes and a control circuit coupled to provide a response to the transaction on the interconnect, in which the response is indicative of a state of the cache coherent block in one or more of the remote nodes identified by the directory, wherein the bridge circuit to cause the transaction to become globally visible to the remote nodes by sending a probe identifying the transaction and in return receiving an acknowledgement from the remote node or nodes having the cache coherent block when the transaction is made visible to the remote nodes, the transaction initiating circuitry to pend completing the transaction until the memory bridge receives the acknowledgment from the remote node or nodes and, upon completion of receiving the acknowledgement or acknowledgements, the control circuit transmits a signal, that includes the transaction identifier, to the transaction initiating circuitry that the transaction affecting the coherent cache block is allowed to be completed.

2. The node as recited in claim 1 wherein the transaction becomes the memory bridge further including a probe buffer to store the probes for transmission to the remote node or nodes.

3. The node as recited in claim 2 wherein the memory bridge is to store the transaction identifier in the probe buffer.

4. The node as recited in claim 1 wherein a separate communication line is used to carry the signal that includes the transaction identifier from the control circuit to the transaction initiating circuitry.

5. The node as recited in claim 4 wherein the transaction is a write transaction.

6. The node as recited in claim 4 wherein the transaction initiating circuitry is a memory controller that couples to a memory and the transaction is a read transaction.

7. The node as recited in claim 1 wherein the transaction initiating circuitry does not pend completing the transaction if the memory bridge indicates that no remote node has the cache coherent block.

8. An integrated circuit to operate as a local node in a multiple node system, comprising:
an interconnect;
an agent coupled to the interconnect to initiate a transaction on the interconnect, the transaction addressing a cache coherent block of data in which a transaction identifier is associated with the transaction; and
a memory bridge coupled to the interconnect and to interface circuits that communicate with other nodes in the system, the memory bridge including a directory to track local cache blocks residing in remote nodes and a control circuit coupled to provide a response to the transaction on the interconnect, in which the response is indicative of a state of the cache coherent block in one or more of the remote nodes identified by the directory, wherein the bridge circuit to cause the transaction to become globally visible to the remote nodes by sending a probe identifying the transaction and in return receiving an acknowledgement from the remote node or nodes having the cache coherent block when the transaction is made visible to the remote nodes, the agent to rend completing the transaction until the memory bridge receives the acknowledgment from the remote node or nodes and, upon completion of receiving the acknowledgement or acknowledgements, the control circuit transmits a signal, that includes the transaction identifier, to the agent that the transaction affecting the coherent cache block is allowed to be completed.

9. The integrated circuit as recited in claim 8 wherein the transaction is a read transaction and the agent is a memory controller.

10. The integrated circuit as recited in claim 9 wherein the read transaction is a read exclusive transaction.

11. The integrated circuit as recited in claim 9 wherein the memory controller pends completing the transaction by delaying the data transfer responsive to a shared response from the memory bridge.

12. The integrated circuit as recited in claim 8 wherein the transaction is a write transaction.

13. The integrated circuit as recited in claim 12 wherein the agent is pends completing the transaction by delaying the transfer of data responsive to a shared or exclusive response from the memory bridge.

14. The integrated circuit as recited in claim 8 wherein the agent is a packet direct memory access (DMA) circuit coupled to receive packet data from one or more packet interfaces.

15. The integrated circuit as recited in claim 8 wherein the agent is an input/output (I/O) bridge coupled to one or more I/O interfaces.

16. A method comprising:
initiating a transaction from an agent of a local node, the transaction addressing a cache coherent block of data in which a transaction identifier is associated with the transaction;
accessing a directory in the local node to determine if the cache coherent block of data resides in a remote node or nodes;
determining a state of the cache coherent block residing in the remote node or nodes;
pending completion of execution of the transaction by the agent in the local node;
sending a probe identifying the transaction to the remote nodes to obtain global visibility;
receiving acknowledgement from the remote node or nodes having the cache coherent block;
transmitting a signal, that includes the transaction identifier, to the agent upon completion of receiving the acknowledgment from the remote node or nodes that remote nodes have visibility of the transaction; and
completing the execution of the transaction by the agent upon receiving the signal.

17. The method as recited in claim 16 wherein pending completion of the transaction includes delaying transfer of data when executing a read instruction from a memory controller.

18. The method as recited in claim 16 wherein pending completion of the transaction includes delaying transfer of data when executing a write instruction.

19. The method as recited in claim 16 wherein pending completion of the transaction includes delaying transfer of data when executing a read exclusive instruction.

* * * * *

UNITED STATES PATENT AND TRADEMARK OFFICE
CERTIFICATE OF CORRECTION

PATENT NO.         : 6,948,035 B2
APPLICATION NO. : 10/414363
DATED              : September 20, 2005
INVENTOR(S)        : Joseph Rowlands et al.

Page 1 of 1

It is certified that error appears in the above-identified patent and that said Letters Patent is hereby corrected as shown below:

Column 27, line 58, in Claim 8: replace "rend" with --pend--.

Signed and Sealed this

Twenty-third Day of December, 2008

JON W. DUDAS
*Director of the United States Patent and Trademark Office*